United States Patent
Kihara et al.

(10) Patent No.: US 8,649,077 B2
(45) Date of Patent: Feb. 11, 2014

(54) IMAGE RECORDING MEDIUM, HOLOGRAM REPLICATING DEVICE AND HOLOGRAM REPLICATING METHOD

(75) Inventors: Nobuhiro Kihara, Kanagawa (JP); Akira Shirakura, Tokyo (JP)

(73) Assignee: Sony Corporation, Tokyo (JP)

( * ) Notice: Subject to any disclaimer, the term of this patent is extended or adjusted under 35 U.S.C. 154(b) by 7 days.

(21) Appl. No.: 13/288,242

(22) Filed: Nov. 3, 2011

(65) Prior Publication Data

US 2012/0044552 A1    Feb. 23, 2012

Related U.S. Application Data

(62) Division of application No. 12/637,852, filed on Dec. 15, 2009, now Pat. No. 8,564,864.

(30) Foreign Application Priority Data

Dec. 29, 2008  (JP) ................................. 2008-335639
Sep. 11, 2009  (JP) ................................. 2009-210296

(51) Int. Cl.
*G03H 1/20*    (2006.01)

(52) U.S. Cl.
USPC .......................................................... 359/12

(58) Field of Classification Search
USPC .......................................................... 359/12
See application file for complete search history.

(56) References Cited

U.S. PATENT DOCUMENTS

| | | | | |
|---|---|---|---|---|
| 3,614,426 A | * | 10/1971 | Donzelle ........................... | 378/23 |
| 5,991,057 A | * | 11/1999 | Goldstein ......................... | 359/32 |
| 2007/0070479 A1 | * | 3/2007 | Brotherton-Ratcliffe et al. ................ | 359/29 |
| 2007/0081207 A1 | * | 4/2007 | Bimber .............................. | 359/9 |
| 2007/0183011 A1 | | 8/2007 | Yamauchi et al. | |
| 2008/0186548 A1 | * | 8/2008 | Teraoka ........................... | 359/24 |

FOREIGN PATENT DOCUMENTS

| | | |
|---|---|---|
| JP | 11-258970 | 9/1999 |
| JP | 2001-125475 | 5/2001 |
| JP | 2003-058027 | 2/2003 |
| JP | 2004-333880 | 11/2004 |
| JP | 2006106432 | 4/2006 |
| JP | 2006-292989 | 10/2006 |
| JP | 2008-122670 | 5/2008 |
| JP | 2009170086 | 7/2009 |
| JP | 2001-249606 | 9/2011 |

OTHER PUBLICATIONS

JP Office Action in related JP Patent Application No. 2011-123966 dated Mar. 26, 2013.

* cited by examiner

*Primary Examiner* — Jennifer L. Doak
(74) *Attorney, Agent, or Firm* — Dentons US LLP

(57) ABSTRACT

An image recording medium in which a refractive index modulation is recorded in a material in a layer such that, when the hologram recording medium is illuminated from a predetermined angle and a viewpoint is moved horizontally with respect to a normal line, a hologram image having continuous parallax in at least the horizontal direction is reproduced and that, when the viewpoint is moved in a direction with respect to the normal line different from the horizontal direction, another image that is different from and thus is not continuous with the hologram image is reproduced.

9 Claims, 22 Drawing Sheets

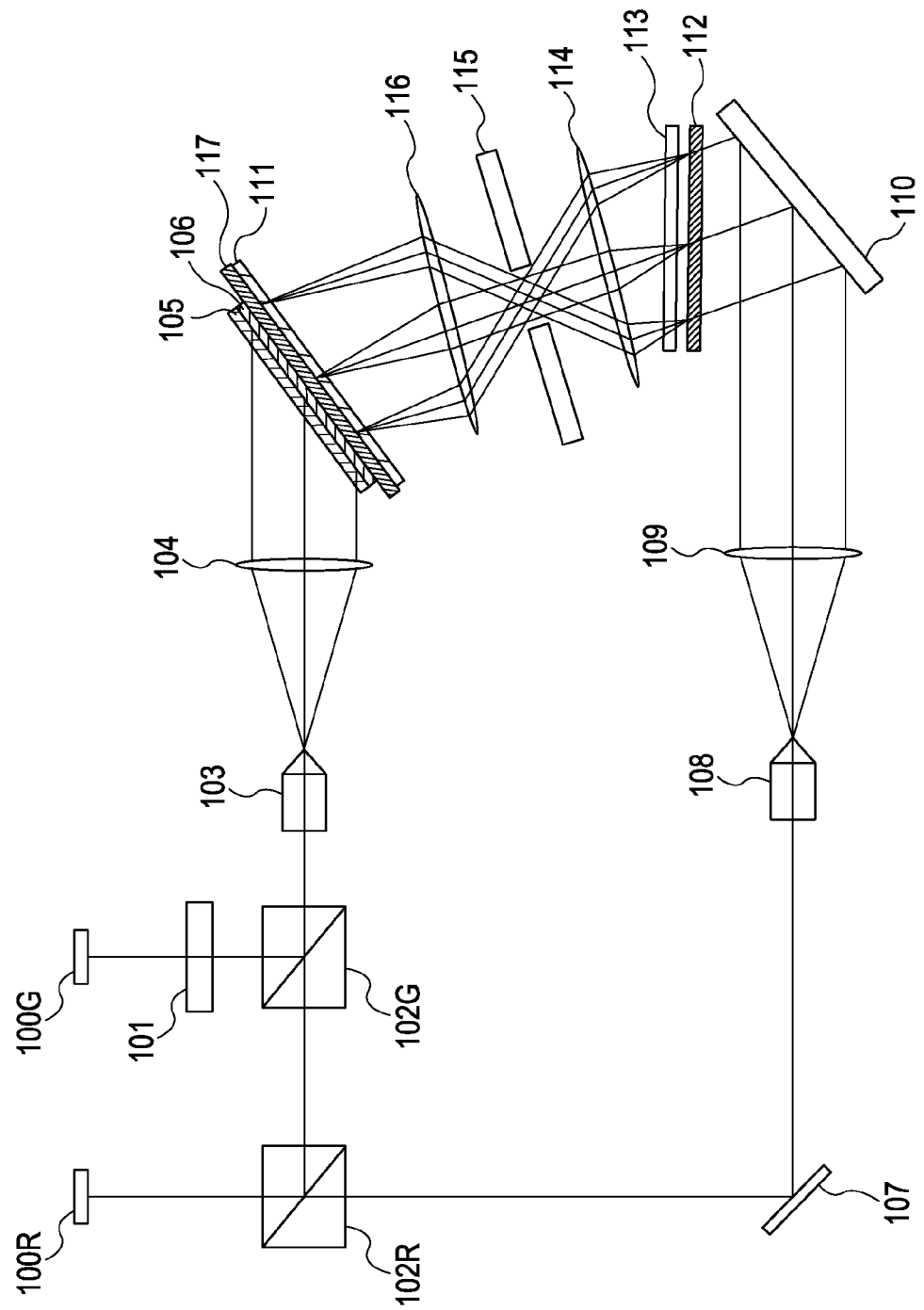

IMAGE RECORDING MEDIUM, HOLOGRAM REPLICATING DEVICE AND HOLOGRAM REPLICATING METHOD

RELATED APPLICATION DATA

This application is a division of U.S. patent application Ser. No. 12/637,852, filed Dec. 15, 2009, the entirety of which is incorporated herein by reference to the extent permitted by law. The present application claims priority to Japanese Patent Application JP 2008-335639 filed in the Japan Patent Office on Dec. 29, 2008, and 2009-210296 filed in the Japan Patent Office on Sep. 11, 2009, the entirety both of which are also incorporated by reference herein to the extent permitted by law.

BACKGROUND OF THE INVENTION

The present invention relates to a hologram replicating device, a hologram replicating method that uses contact printing and a replicated image recording medium.

Holograms which provide stereoscopic images are used for authentification of, for example, credit cards and ID cards. Embossed holograms having an interference film recorded by providing surface unevenness are now often employed. Embossed holograms, however, are easy to forge. Lippmann holograms, in which an interference film is recorded as differences in refractive index inside the film, are very difficult to forge. This is because highly advanced technology is necessary to produce a recorded Lippmann image and the recording material is not easily available. A Lippmann hologram can be produced by using an actually captured hologram obtained by irradiating an object with a laser or using a holographic stereogram recorded on the basis of parallax images observed from multiple viewpoints.

Schematically, a process for producing a Lippmann holographic stereogram includes a content producing step for, for example, acquiring images and editing the acquired images, a hologram master generating step and a replicating (i.e., mass-producing) step. The image is acquired by image capturing or generated through computer graphics. Each of the acquired images acquired in the image editing step is converted into a strip-shaped image by, for example, a cylindrical lens. A hologram master is produced by sequentially recording interference fringes of object light of the images and reference light on a hologram recording medium as strip-shaped element holograms. The hologram recording medium and the hologram master are brought into close contact with each other and irradiated with a laser beam, whereby a hologram is replicated.

In this hologram, for example, image information acquired by sequentially performing image capturing from different viewpoints along a transverse direction is sequentially recorded as strip-shaped element holograms along the transverse direction. When this hologram is observed by a viewer with both eyes, two-dimensional (2D) images observed by the left and right eyes slightly differ from each other. This phenomenon causes the viewer to experience parallax, and a three-dimensional (3D) image is reproduced.

If the strip-shaped element holograms are sequentially recorded as described above, a horizontal-parallax-only (HPO) holographic stereogram having parallax only in the horizontal direction is generated. The HPO holographic stereogram can be printed in a short time and with high recording quality. Vertical parallax can also be employed in the recording method. Holograms with parallax in both horizontal and vertical directions are called full parallax holograms.

As described above, a Lippmann hologram is difficult to forge compared with an embossed hologram and thus is suitable for use in verifying authentification of, for example, credit cards and ID cards. If additional information, such as a serial number and identification (ID) information, can be recorded, forgery becomes more difficult. Since it is inefficient to generate holograms one at a time using a printer, replication of plural holograms by contact printing has been proposed.

In a replication device of the related art which employs contact printing as illustrated in FIG. 23, a laser beam (i.e., S polarized light) from a laser light source 200 is expanded by a spatial filter 203 and is incident on a collimation lens 204. A hologram recording medium 205 having a photosensitive material and a hologram master 206 are irradiated with parallel laser beams collimated by the collimation lens 204.

The hologram master 206 is a reflection hologram, e.g., a Lippmann hologram. The hologram recording medium 205 has a photosensitive material layer and is in close contact with the hologram master 206 directly or with a refractive index adjusting liquid (also called an index matching liquid) therebetween. An interference fringe formed by light diffracted by the hologram master 206 and an incidence laser beam is recorded on the hologram recording medium 205.

In order to make forgery of the hologram more difficult, recording of additional information in the hologram has been proposed. For example, Japanese Unexamined Patent Application Publication (JP-A) No. H11-258970 discloses recording of additional information during contact printing of the hologram.

In the device disclosed in JP-A-H11-258970, a reflection hologram master and a recording film are in close contact with each other with an optical adhesion liquid therebetween and a reflective liquid crystal device is disposed at a non-hologram area neighboring the hologram master. Additional information is displayed on a reflective liquid crystal device by a computer. The hologram master and the liquid crystal device are irradiated with a laser beam from a side of the recording film via an optical system. Reflected light (i.e., object light) and reference light from the hologram master are made to interfere with each other within the recording film so as to implement hologram recording. At the same time, the reflected light from the reflective liquid crystal device and the reference light interfere with each other within the hologram recording film and the additional information displayed by the reflective liquid crystal device is recorded in the recording film.

JP-A-2008-122670 discloses a screen switching hologram in which different 3D screens are switched between depending on the viewpoint. The disclosed hologram is recorded in two steps. In a first step, objects to be displayed on different screens are recorded on plural element hologram recording materials as holograms using reference light at the same incidence angle and the plural element holograms are arranged in parallel to form a first level hologram. Next, the object image recorded on each element hologram from the first level hologram is reproduced simultaneously. A second level hologram recording material is disposed near the reproduced object image and is recorded as a reflection or a transmission volume hologram. In reproduction of the thus-recorded hologram, different hologram images are reproduced depending on the viewpoint of an observer.

SUMMARY OF THE INVENTION

In the technique disclosed in JP-A-H11-258970, since the reflective liquid crystal device is disposed in the non-hologram area, no additional information can be recorded in the hologram area. It was therefore necessary to enlarge the non-hologram area in order to record a relatively large amount of additional information, such as numbers and characters. It was not possible to record the additional information in the hologram area to allow the recorded additional information to be observed by vertically shifting the viewpoint.

In the process disclosed in JP-A-2008-122670 can control a viewing area of the first level hologram. When the viewpoint is moved, however, the diffracted light intensity is changed rapidly and thus the images are changed rapidly. There is thus difficulty in viewing.

It is therefore desirable to provide an image recording medium, a hologram replication device and a hologram replicating method which allow additional information to be recorded in a hologram area, allow the additional information to be observed from different viewpoints and reduce rapid variation in diffracted light intensity with movements in viewpoints, thereby avoiding difficulty in viewing.

A first embodiment of the invention is an image recording medium in which a refractive index modulation is recorded in a material in a layer such that, when the hologram recording medium is illuminated from a predetermined angle and a viewpoint is moved horizontally with respect to a normal line, a hologram image having continuous parallax in at least the horizontal direction is reproduced and that, when the viewpoint is moved in a direction with respect to the normal line different from the horizontal direction, another image that is different from and thus is not continuous with the hologram image is reproduced.

A second embodiment of the invention is a hologram replicating device, including: a hologram recording medium which includes a photosensitive material; a hologram master which is brought into close contact with a surface of the hologram recording medium directly or with a refractive index adjustor therebetween; a spatial light modulation element which modulates a laser beam in accordance with additional information; and an image formation optical system which irradiates the hologram recording medium with light modulated by the spatial light modulation element, wherein an image of the hologram master and the additional information are recorded by simultaneously irradiating the hologram recording medium with reference light and the modulated light.

A third embodiment of the invention is a method of replicating a hologram, including the steps of: bringing a hologram master into close contact with a surface of a hologram recording medium directly or with a refractive index adjustor therebetween, the hologram recording medium including a photosensitive material; modulating a laser beam in accordance with additional information by using a spatial light modulation element; irradiating the hologram recording medium with the modulated light simultaneously with reference light for replication via an image formation optical system; and recording object light from the hologram master and the additional information in the hologram recording medium.

A fourth embodiment of the invention is a hologram replicating device, including: a hologram recording medium which includes a photosensitive material; a hologram master which is brought into close contact with a surface of the hologram recording medium directly or with a refractive index adjustor therebetween; a laser beam forming section which generates reference light for replication and at least first and second laser beams through branching; a first spatial light modulation element and a second spatial light modulation element which modulate the first and the second laser beams in accordance with first and second additional information, respectively; and a first image formation optical system and a second image formation optical system which irradiate the hologram recording medium with first and second light which are modulated by the first and the second spatial light modulation elements, respectively, wherein: the hologram recording medium is irradiated with the modulated first light and the modulated second light simultaneously with the reference light for replication at different incidence angles; and an image of the hologram master and the first and the second additional information are recorded in the hologram recording medium.

A fifth embodiment of the invention is a method of replicating a hologram, including the steps of: generating at least a first laser beam and a second laser beams through branching; modulating the first laser beam and the second laser beams in accordance with first and second additional information by using a first spatial light modulation element and a second spatial light modulation element, respectively; irradiating the hologram recording medium with the modulated first light and the modulated second light simultaneously with reference light for replication at different incidence angles; and recording an image in a hologram master and the first and the second additional information in the hologram recording medium.

A sixth embodiment of the invention is a hologram replication device, including: a first recording section which brings a hologram master which into close contact with a surface of a hologram recording medium directly or with a refractive index adjustor therebetween and records a hologram in the hologram master on the hologram recording medium by using reference light for replication, the hologram recording medium including a photosensitive material; a second recording section which modulates a laser beam in accordance with additional information by using a spatial light modulation element, irradiates the hologram recording medium with the modulated light via an image formation optical system and records the additional information in the hologram recording medium; and a fixation section which fixes the recorded photosensitive material, wherein the second recording section is disposed upstream or downstream of the first recording section and upstream of the fixation section.

A seventh embodiment of the invention is a method of replicating a hologram, including the steps of: first recording in which a hologram master is brought into close contact with a surface of a hologram recording medium directly or with a refractive index adjustor therebetween and a hologram in the hologram master is recorded on the hologram recording medium by using reference light for replication, the hologram recording medium including a photosensitive material; second recording in which a laser beam is modulated in accordance with additional information by using a spatial light modulation element, the hologram recording medium is irradiated with the modulated light via an image formation optical system and the additional information is recorded in the hologram recording medium; and fixing the recorded photosensitive material, wherein the second recording is conducted before or after the first recording and before the fixing.

In the invention, additional information can be recorded in a hologram recording area of the hologram master. With the image recording medium, additional information can be observed by moving the viewpoint in, for example, the vertical direction. The additional information does not interfere with a replicated image of the hologram master. A 2D image is reproduced with a luminance intensity distribution in which luminance intensity becomes maximum at a designed value angle in a vertical direction with respect to the normal line and gradually decreases as a distance from the angle becomes larger. The angle differs from an angle at which the hologram having an image recorded therein or the holographic stereogram is reproduced with maximum intensity.

BRIEF DESCRIPTION OF THE DRAWINGS

FIG. 21 is a schematic diagram illustrating a configuration of a replicating device according to a fifth embodiment of the invention;

DESCRIPTION OF THE PREFERRED EMBODIMENTS

Figure 1:
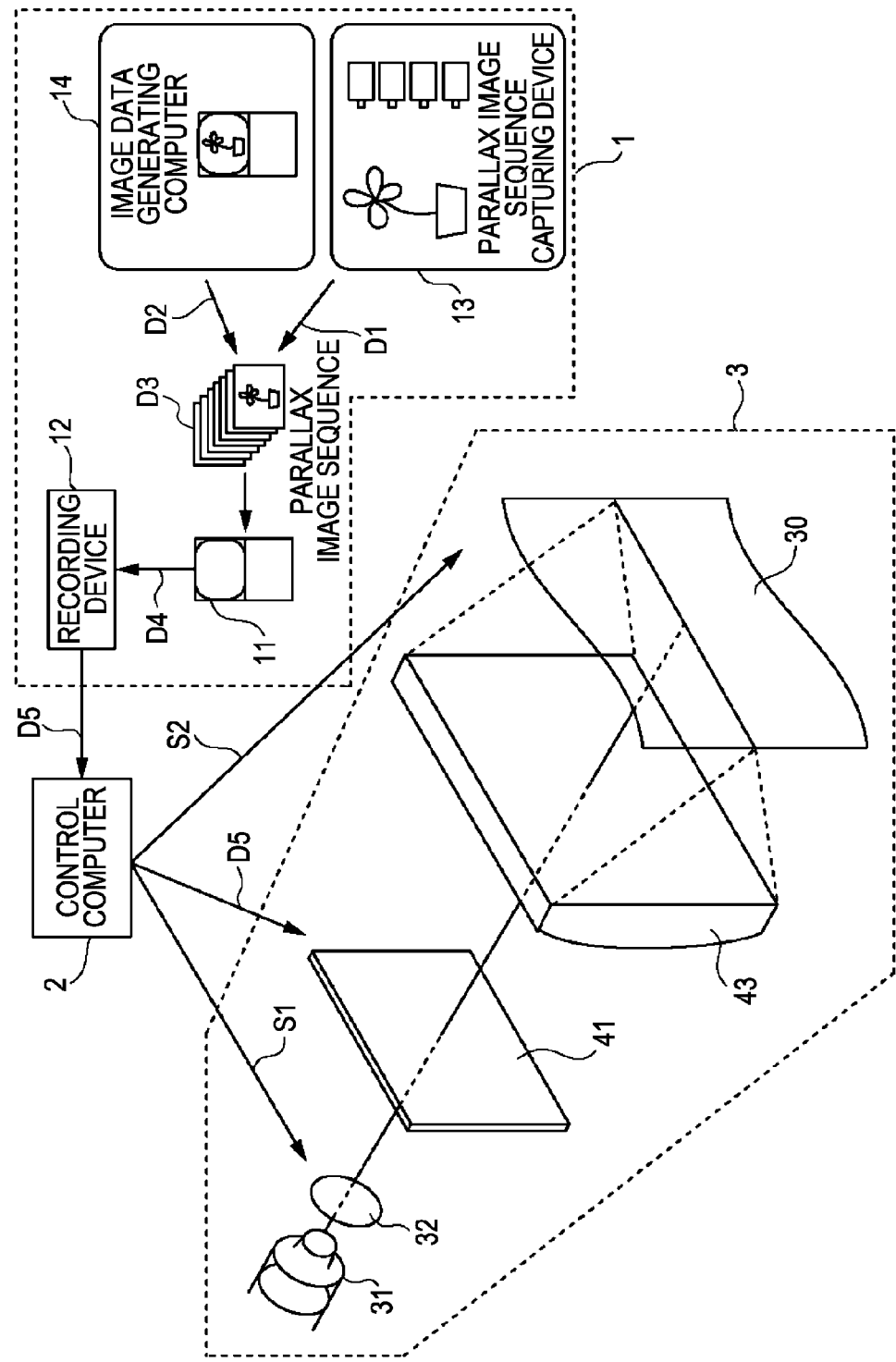
FIG. 1 is a schematic diagram illustrating an exemplary configuration of a holographic stereogram generation system to which the invention is applicable.

Hereinafter, the best mode (hereinafter, referred to as "embodiment") for implementing the invention will be described. Description will be given in the following order.
1. Generation of Original Hologram
2. First Embodiment
3. Second Embodiment
4. Third Embodiment
5. Fourth Embodiment
6. Fourth Embodiment
7. Modified Embodiment Those described below are preferred embodiments of the invention and are thus limited in terms of technical preference. The scope of the invention, however, is not limited to those embodiments unless otherwise indicated.
1. Generation of Original Hologram
Holographic Stereogram Generation System Before describing a replicating device and a replicating method according to embodiments of the invention, generation of a hologram master to be replicated will be described. Generally, a hologram that reproduces a 3D image can be generated on the basis of original images, i.e., 2D images of an object observed from different viewpoints. A holographic stereogram is produced on the basis of original images, i.e., images acquired by, for example, sequentially capturing an object from different viewpoints and sequentially recording these images on a single hologram recording medium as strip-shaped element holograms.

The sequentially recorded strip-shaped element holograms generate a horizontal parallax only (HPO) holographic stereogram having only horizontal parallax. The HPO holographic stereogram can be printed in a short time and recorded with high quality. There was an increasing demand to record a stereoscopic image more naturally by providing vertical parallax along with the horizontal parallax. The embossed hologram used for the purpose of forgery prevention of credit cards can be forged easily and thus an advanced volume (i.e., Lippmann) recording medium is now replacing the embossed hologram. With the volume recording medium, vertical direction parallax that is not able to be theoretically displayed by the embossed hologram can also be recorded. There has therefore been a demand in a recording process to enhance the forgery prevention effect while also employing vertical parallax.

A full parallax (FP) holographic stereogram with both horizontal and vertical parallax has established an optical system by using a combination of spherical lenses. The present inventors have proposed an image recording device that can solves those problems regarding methods of generating the related art full parallax holograms. With the proposed image recording device, a high quality full parallax holographic stereogram having the vertical parallax, the horizontal parallax and number of independent parallax can be obtained by using an optical system, a mechanical section and a control section that record element holograms having the horizontal parallax. With this configuration, compared with those with dot-like full parallax, a hologram of high quality with less apparent element hologram configuration can be obtained at a high speed.

First, an exemplary configuration of a holographic stereogram generation system for generating a holographic stereogram will be described. A device for providing a holographic stereogram which has horizontal parallax information by recording plural strip-shaped element holograms on a single recording medium will be described below.

This holographic stereogram generation system produces a one-step holographic stereogram, in which a holographic stereogram hologram recording medium having interference fringes of object light and reference light recorded is directly employed as a holographic stereogram. As illustrated in FIG. 1, the holographic stereogram generation system includes a data processor 1, a control computer 2 and a holographic stereogram printing device 3. The data processor 1 processes image data to be recorded. The control computer 2 controls the entire holographic stereogram generation system. The holographic stereogram printing device 3 includes an optical system for generating a holographic stereogram.

The data processor 1 generates a parallax image sequence D3 on the basis of image data D1 including parallax information supplied from a parallax image sequence capturing device 13 provided with, for example, a multi-view camera and a portable camera. The parallax image sequence D3 is generated on the basis of image data D2 which includes parallax information as other data generated by an image data generating computer 14.

The image data D1 including the parallax information supplied from the parallax image sequence capturing device 13 is image data corresponding to plural images. The image data are acquired by, for example, capturing a real object from different viewpoints along a horizontal direction by simultaneously capturing using a multi-view camera or continuous capturing using a portable camera.

Image data D2 including parallax information is generated by the image data generating computer 14. The image data D2 is, for example, plural computer-aided design (CAD) image data and computer graphics (CG) image data generated by sequentially providing the parallax along the horizontal direction.

The data processor 1 performs predetermined image processing for the holographic stereogram by using a computer 11 for image processing with respect to the parallax image sequence D3. The data processor 1 then records the processed data, i.e., image data D4, on a storage unit 12, such as a memory or a hard disk.

When recording the image on the hologram recording medium, the data processor 1 sequentially reads data for each image from the image data D4 recorded on the storage unit 12 and transmits the read data, i.e., image data D5, to the control computer 2.

The control computer 2 drives the holographic stereogram printing device 3. Images on the basis of the image data D5 supplied from the data processor 1 are sequentially recorded as strip-shaped element holograms on a hologram recording medium 30 placed in the holographic stereogram printing device 3.

The control computer 2 controls a shutter 32, a display device 41, a recording medium feed mechanism and other devices provided in the holographic stereogram printing device 3 as describe later. In particular, the control computer 2 sends a control signal S1 to the shutter 32 so as to control opening and closing of the shutter 32. The control computer 2 supplies the image data D5 to the display device 41 on which an image on the basis of the image data D5 is displayed. The control computer 2 sends a control signal S2 to the recording medium feed mechanism so as to control feeding action of the hologram recording medium 30 by the recording medium feed mechanism.

Figure 2:
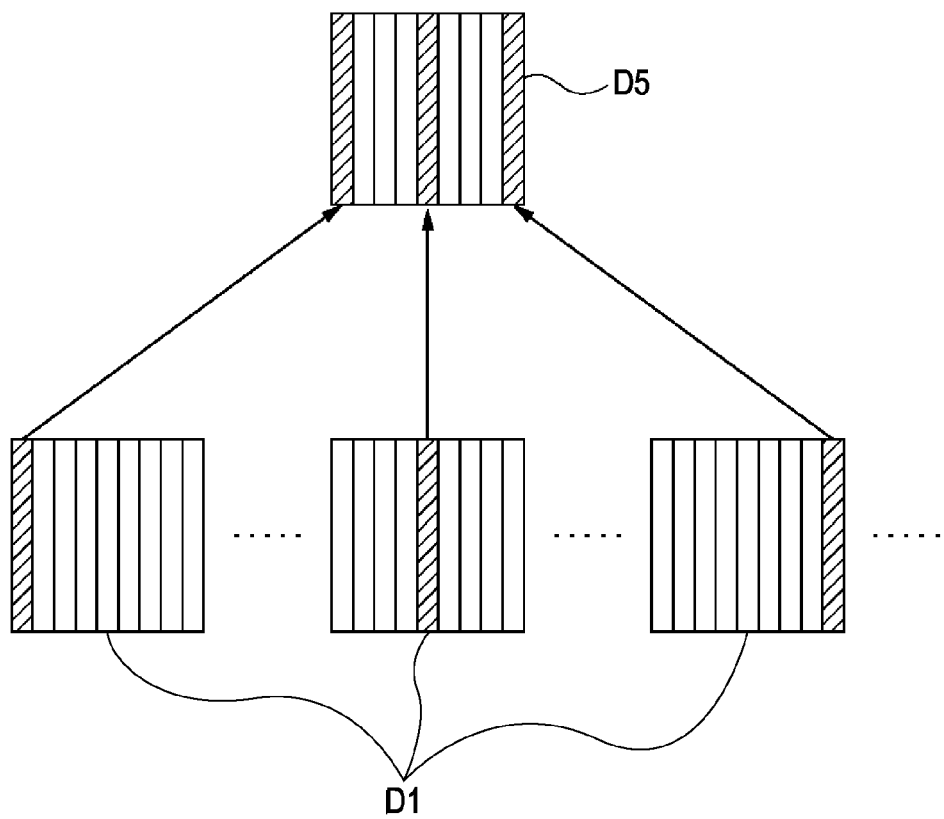
FIG. 2 is a schematic diagram illustrating exemplary image processing during generation of a holographic stereogram.

As illustrated in FIG. 2, the image processing includes dividing each piece of the image data D1 including the parallax information in a parallax direction, i.e., a transverse (width) direction, and slices are then gathered to reconstruct a processed image, i.e., an image D5. The image D5 is displayed on the display device 41.

Figure 3A:
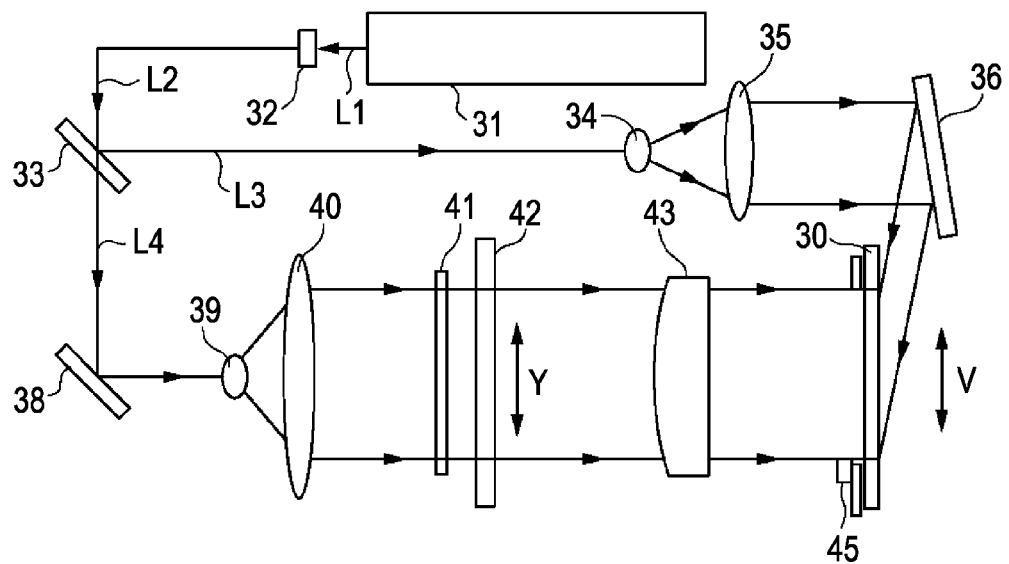
FIGS. 3A and 3B each are a schematic diagram illustrating an exemplary optical system of a holographic stereogram printing device.
Figure 3B:
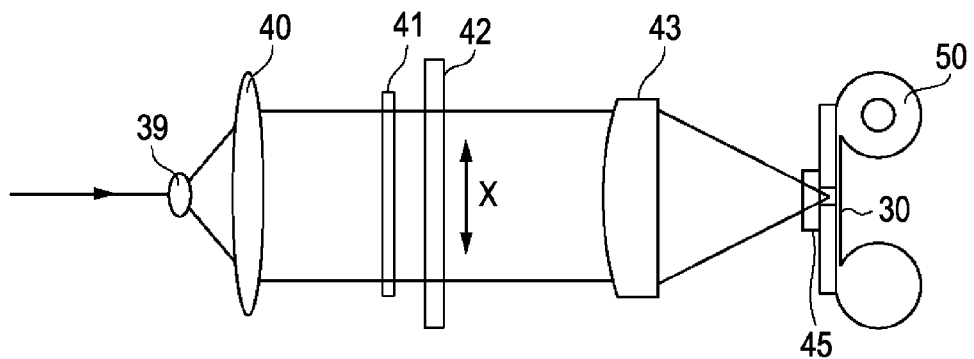

The optical system of the holographic stereogram printing device 3 described above will be described in more detail with reference to FIGS. 3A and 3B. FIG. 3A illustrates an optical system of the entire holographic stereogram printing device 3 in a top view. FIG. 3B illustrates the optical system of the entire holographic stereogram printing device 3 in a lateral view.

Holographic Stereogram Printing Device

As illustrated in FIGS. 3A and 3B, the holographic stereogram printing device 3 includes a laser light source 31, a shutter 32, mirror 38 and a half mirror 33. The laser light source 31 emits a laser beam of predetermined wavelength. The shutter 32 is disposed on an optical axis of a laser beam L1 from the laser light source 31. The laser light source 31 herein emits a laser beam having the wavelength of about 532 nm, for example.

The shutter 32 is controlled by the control computer 2 to be closed when the hologram recording medium 30 is not exposed and opened when the hologram recording medium 30 is exposed. The half mirror 33 separates a laser beam L2 which has passed the shutter 32 into reference light and object light. Light L3 reflected by the half mirror 33 is converted into the reference light and light L4 transmitted the half mirror 33 is converted into the object light.

In this optical system, an optical path length of the reference light which is reflected by the half mirror 33 and is incident on the hologram recording medium 30 and an optical path length of the object light which transmits the half mirror 33 and is incident on the hologram recording medium 30 are the almost same length. With this configuration, coherence of the reference light and the object light is increased and a holographic stereogram that may provide a sharper reproduced image can be obtained.

An optical system for the reference light, including a cylindrical lens 34, a collimating lens 35 and a reflective mirror 36 are disposed on the optical axis of the light L3 reflected by the half mirror 33 in this order. The collimating lens 35 collimates the reference light to form parallel beams. The reflective mirror 36 reflects the parallel beams from the collimating lens 35.

The light reflected by the half mirror 33 is first formed as diverging light by the cylindrical lens 34 and then formed as parallel beams by the collimating lens 35. The parallel beams are then reflected by the reflective mirror 36 and is incident on a back surface of the hologram recording medium 30.

An optical system for the object light is provided on an optical axis of light L4 which has transmitted the half mirror 33. The optical system includes a reflective mirror 38, a spatial filter 39 and a collimating lens 40. The reflective mirror 38 reflects light transmitted the half mirror 33. The spatial filter 39 is formed by combining a convex lens and a pinhole. The collimating lens 40 converts the object light into parallel beams. A display device 41 and a one-dimensional (1D) diffuser plate 42 are also included. The display device displays an image to be recorded. The 1D diffuser plate 42 diffuses light which has transmitted the display device 41 in the width direction of the element hologram. A cylindrical lens 43 and an optical function plate 45 are also included. The cylindrical lens 43 focuses the object light which transmitted the 1D diffuser plate 42 on the hologram recording medium 30. The optical function plate 45 has a 1D diffusion function.

The cylindrical lens 43 focuses the object light to a first parallax direction (i.e., a width direction of the element hologram or a horizontal direction when observed).

The optical function plate 45 diffuses the focused object light in a 1D manner in a longitudinal direction of the strip-shaped element hologram so as to correspond to the movement of the viewpoint in the longitudinal direction. The optical function plate 45 is a fine structure and examples thereof may include a lenticular lens having fine pitches.

The light L4 which transmitted the half mirror 33 is reflected by the reflective mirror 38 and is then converted into the diverging light from a point light source by the spatial filter 39. The light L4 is then converted into the parallel beams by the collimating lens 40 and then incident on the display device 41. In the present embodiment, a 20-fold object lens and a 20 micrometer-diameter pinhole were used as the spatial filter 39. The focal length of the collimating lens 40 was 100 mm.

The display device 41 is a projection image display device which includes, for example, a liquid crystal display. The display device 41 is controlled by the control computer 2 to display an image on the basis of the image data D5 transmitted from the control computer 2. In this example, the display device 41 was a monochrome liquid crystal panel having a pixel count of 480×1068 and a size of 16.8 mm×29.9 mm.

The light transmitted the display device 41 is converted into light modulated by the image displayed on the display device 41 and is diffused by the 1D diffuser plate 42. The 1D diffuser plate 42 may be disposed near the display device 41 and is disposed immediately upstream or downstream of the display device 41. In this example, the 1D diffuser plate 42 was disposed immediately downstream of the display device 41.

Here, the 1D diffuser plate 42 distributes light in the element hologram by diffusing the transmitted light from the display device 41 in the width direction of the element hologram. The 1D diffuse plate 42 thus contributes to an improvement in image quality of the holographic stereogram to be generated.

The diffuser plate 42 includes a diffuser plate movement means (not shown) which is moved randomly each time the element hologram is formed. Thus, the diffuser plate movement means is placed at different positions for each element hologram. With this configuration, noise positioned at an infinite distance can be reduced when the hologram is observed.

Examples of the diffuser plate movement means include a movement mechanism which moves the diffuser plate 42 in a certain amount by a mechanical technique, such as a stepping motor. A movement direction of the diffuser plate 42 in this configuration may be the width direction (represented by an arrow X in FIG. 3B) of the element hologram or may be a direction perpendicular to the width direction represented by an arrow Y in FIG. 3A). The movement direction of the diffuser plate 42 may be in combination of these directions, may be completely random or may be reciprocating.

With the diffuser plate 42 being disposed, the element hologram is uniformly exposed over the width direction thereof. Thus, image quality of the hologram to be obtained is improved. In order to uniformly expose the element hologram, however, it is necessary to increase the diffusion of the diffuser plate 42 to some extent. The object light diffused by the diffuser plate 42 may be distributed over the hologram recording medium 30 and may cause an area wider than the intended width of the element hologram to be exposed to light.

Figure 4A:
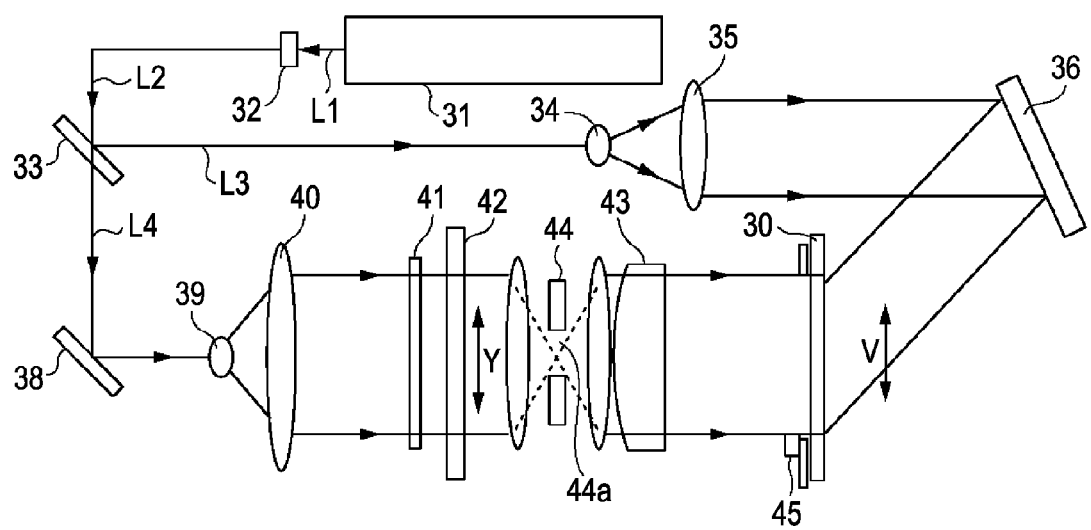
FIGS. 4A and 4B each are a schematic diagram illustrating another exemplary optical system of the holographic stereogram printing device.
Figure 4B:
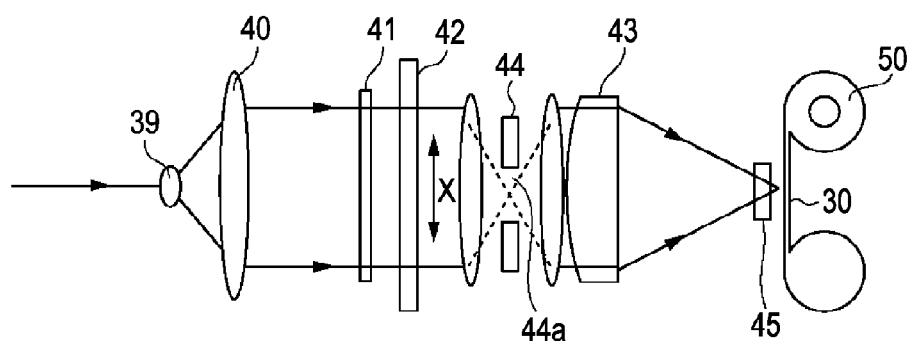

In order to address this problem, a mask 44 is disposed as illustrated in FIGS. 4A and 4B on the optical path so that an image of the mask is projected on the recording material. The mask 44 controls each element hologram to be exposed at an appropriate width. That is, an appropriate and uniform exposure width can be obtained through the diffusion by the diffuser plate 42 and the shielding of unnecessary light by the mask 44. As illustrated in FIGS. 4A and 4B, the mask may be disposed between the diffuser plate 42 and the cylindrical lens 43 or may be disposed near the hologram recording medium 30.

That is, the transmitted light from the display device 41 is caused to transmit the diffuser plate 42, diffuse in the width direction of the element hologram, and then focus on the hologram recording medium 30 by the cylindrical lens 43. With the influence of the diffuser plate 42, the object light is focused not on a narrow range but on an area having a certain width.

As illustrated in FIGS. 4A and 4B, only a central, predetermined range of the focused light is made to transmit an opening 44a of the mask 44 and is incident on the hologram recording medium 30 as the object light. The configuration of the object light is strip-shaped.

As described above, an optical function plate 45 is disposed as a second diffuser plate. The optical function plate 45 causes the object light to be diffused one-dimensionally in the longitudinal direction of the strip-shaped element hologram and the hologram recording medium 30 is irradiated by the object light. With this configuration, a viewing angle of a lengthwise (i.e., vertical) direction of the reflection hologram can be extended.

In a holographic stereogram which only has the parallax in the horizontal direction, the optical function plate 45 provides an optical function angle almost equivalent to a vertical direction viewing angle of the final holographic stereogram. In the invention, however, the 1D diffusion angle is reduced so as to avoid overlap with other identification information which will be described later.

The holographic stereogram printing device 3 includes a recording medium feed mechanism 50 which is able to intermittently feed the hologram recording medium 30 for each one element hologram under the control of the control computer 2. The recording medium feed mechanism 50 is able to intermittently feed the film-shaped hologram recording medium on the basis of control signals from the control computer 2 as will be described later. When a holographic stereogram is generated by the printing device 3, an image on the basis of the image data of the parallax image sequence is sequentially recorded as strip-shaped element holograms on the hologram recording medium 30 placed in the recording medium feed mechanism 50.

Exemplary Hologram Recording Medium

Figure 5:
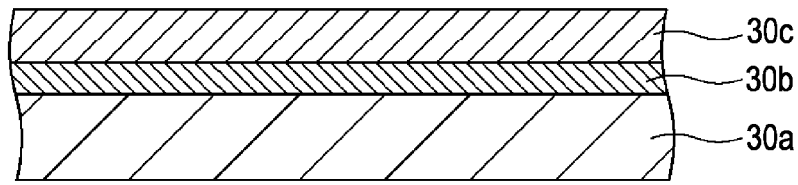
FIG. 5 is a cross-sectional view illustrating an exemplary hologram recording medium.

Here, the hologram recording medium 30 used in the holographic stereogram generation system will be described in detail. As illustrated in FIG. 5, the hologram recording medium 30 includes a tape-like film base material 30a and a photopolymer layer 30b of photopolymerizable photopolymer formed on the film base material 30a. A cover sheet 30c is laminated on the photopolymer layer 30b to provide a film-applied recording medium.

Figure 6A:
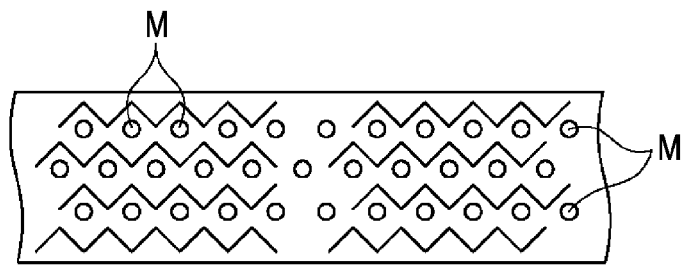
FIGS. 6A to 6C each are a schematic diagram illustrating a photosensing process of a photopolymerizable photopolymer.
Figure 6B:
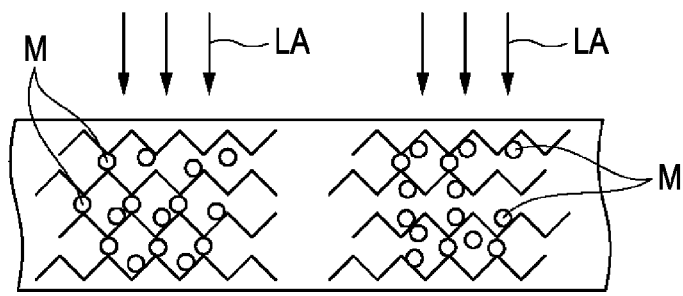
Figure 6C:
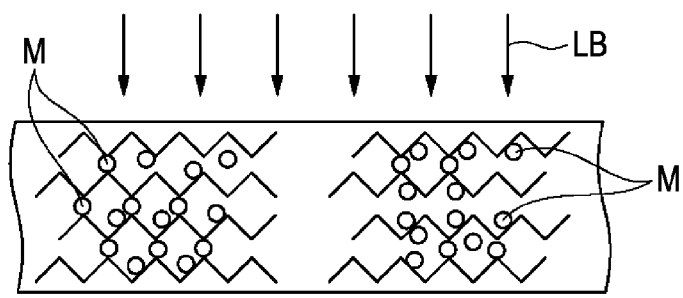

In an initial state of the photopolymerizable photopolymer, monomers M is dispersed uniformly in a matrix polymer as illustrated in FIG. 6A. When the monomers A are irradiated with light LA of about 10 to 400 mJ/cm$^2$ as illustrated in FIG. 6B, the monomers A begins to polymerize in the exposure section. As the polymerization proceeds, the monomers M move from peripheral areas, resulting in variation in concentration of the monomers M. Variation in concentration causes refractive index modulation. Then, as illustrated in FIG. 6C, polymerization of the monomers M is completed when the entire surface is irradiated with UV ray or visible light LB of about 1000 mJ/cm². Since the refractive index changes in accordance with incident light, the photopolymerizable photopolymer is able to record the interference fringe produced by the interference between the reference light and the object light as variation in the refractive index.

It is not necessary for the hologram recording medium 30 using such a photopolymerizable photopolymer to be subject to a dedicated developing process after being exposed. Accordingly, the holographic stereogram printing device 3 according to the present embodiment which uses the hologram recording medium 30 in which the photopolymerizable photopolymer in a photosensitive section can be simplified in configuration.

Recording Medium Feed Mechanism

Figure 7:
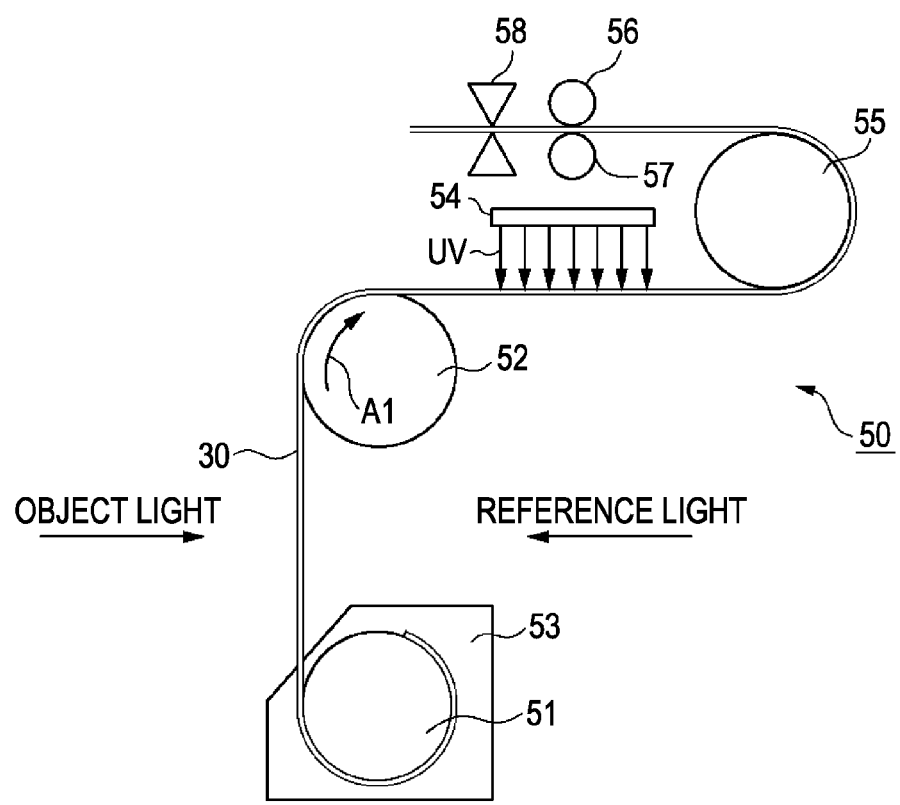
FIG. 7 is a schematic diagram illustrating an exemplary configuration of a recording medium feed mechanism.

Next, the recording medium feed mechanism 50 will be described in detail. FIG. 7 is an enlarged view of the recording medium feed mechanism 50 of the holographic stereogram printing device 3.

As illustrated in FIG. 7, the recording medium feed mechanism 50 includes a roller 51 and an intermittent feed roller 52. The hologram recording medium 30 is housed in a film cartridge 53 while being taken up on the roller 51. The recording medium feed mechanism 50 rotatably supports the roller 51 in the film cartridge 53 with predetermined torque which is loaded at a predetermined position. The hologram recording medium 30 drawn out of the film cartridge 53 is can be held by the roller 51 and the intermittent feed roller 52. The recording medium feed mechanism 50 is configured such that a main surface of the hologram recording medium 30 is substantially vertical to the object light in between the roller 51 and the intermittent feed roller 52. The hologram recording medium 30 is held with this configuration. The roller 51 and the intermittent feed roller 52 are urged in directions apart from each other by a torsion coil spring. Such a configuration imparts a predetermined tension to the hologram recording medium 30 spanned between the roller 51 and the intermittent feed roller 52.

The intermittent feed roller 52 of the recording medium feed mechanism 50 is connected to a stepping motor which is not illustrated and thus is rotatable in a direction represented by an arrow Al in the drawing by the torque from the stepping motor. The stepping motor causes the intermittent feed roller 52 to sequentially rotate at a predetermined angle corresponding to one element hologram after each image is exposed on the basis of the control signal S2 supplied from the control computer 2. Thus, the hologram recording medium 30 is fed by an amount of one element hologram after each image is exposed.

A UV lamp 54 is disposed downstream of the intermittent feed roller 52 on the path of the hologram recording medium 30. The UV lamp 54 completes the polymerization of the monomers M of the exposed hologram recording medium 30. The UV lamp 54 is configured to emit UV at predetermined power onto the hologram recording medium 30 fed by the intermittent feed roller 52.

A rotatably supported heat roller 55, a pair of discharging feed rollers 56 and 57 and a cutter 58 are disposed in this order in a downstream of the UV lamp 54 on the path of the hologram recording medium 30.

The discharging feed rollers 56 and 57 feed the hologram recording medium 30 such that a cover sheet 30c side of the hologram recording medium 30 is wound closely onto about a half of a peripheral surface of the heat roller 55. The discharging feed rollers 56 and 57 are connected to a stepping motor, not illustrated, and can be rotated by the torque from the stepping motor. The stepping motor is rotated on the basis of the control signal S2 supplied from the control computer 2. That is, each time after one image is exposed, the discharging feed rollers 56 and 57 rotate synchronizing with the rotation of the intermittent feed roller 52 at a predetermined angle corresponding to one element hologram. In this manner, the hologram recording medium 30 can be fed while adhering reliably to the peripheral surface of the heat roller 55 without slackening between the intermittent feed roller 52 and discharging feed rollers 56 and 57.

The heat roller 55 includes a built-in heat generator, such as a heater, which can keep the temperature of the peripheral surface at about 120° C. The heat roller 55 heats a photopolymer layer 30b of the fed hologram recording medium 30 via a cover sheet 30c. When heated, a refractive index modulation factor of the photopolymer layer 30b increases and the recorded image is fixed to the hologram recording medium 30. Accordingly, an outer diameter of the heat roller 55 is selected so that a recorded image can be fixed in a period of time since the hologram recording medium 30 comes in touch with the peripheral surface and until leaves it.

The cutter 58 has a cutter driving mechanism, not illustrated, which is driven to cut the fed hologram recording medium 30. The cutter driving mechanism drives the cutter 58. That is, after all of the images on the basis of the image data of the parallax image sequence are recorded on the recording medium 30, the cutter 58 is driven when all the image-recorded areas of the recording medium 30 are discharged. In this manner, the area in which the image data is recorded is separated from the rest of the areas and is discharged outside as a single holographic stereogram.

Operation of Holographic Stereogram Generation System

Figure 8:
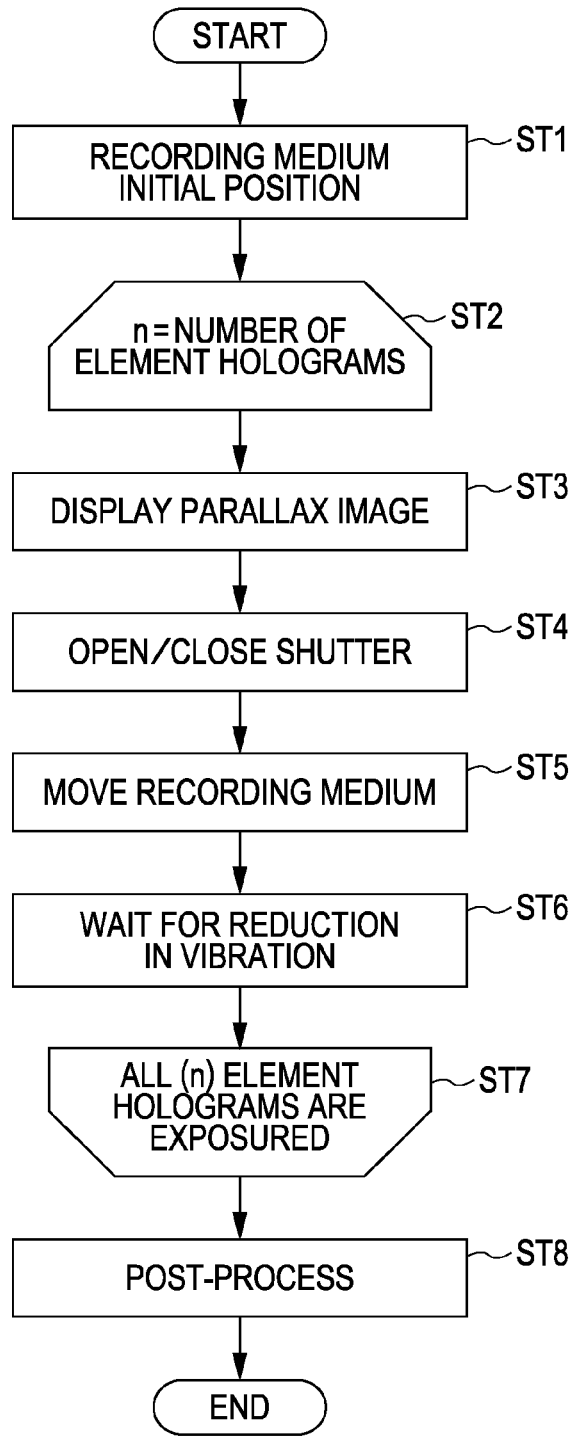
FIG. 8 is a flowchart illustrating an exemplary exposing process.

An operation of generating a holographic stereogram in the thus-configured holographic stereogram generation system under control of the control computer 2 will be described with reference to a flowchart of FIG. 8.

At step ST1, the hologram recording medium 30 is in its initial position. A loop starts at step ST2 and ends at step ST7. Each time the series of processes at steps ST3 to ST6 is completed, one element hologram is processed. Steps ST3 to ST6 are repeated until all (n) the element holograms are processed.

At step ST3, the control computer 2 drives the display device 41 on the basis of the image data D5 supplied from the data processor 1 and causes an image to be displayed on the display device 41. At step ST4, the control computer 2 sends a control signal S1 to the shutter 32 to cause the shutter 32 to open for a predetermined time so that the hologram recording medium 30 is exposed to light. The light L3 reflected by the half mirror 33 among the laser beam L2 emitted from the laser light source 31 and transmitted the shutter 32 is incident on the hologram recording medium 30 as reference light. At the same time, the light L4 transmitted the half mirror 33 is converted into projected light on which the image displayed on the display device 41 is projected. The projected light is incident on the hologram recording medium 30 as object light. In this manner, one image displayed on the display device 41 is recorded on the hologram recording medium 30 as strip-shaped element holograms.

After an image is recorded, at step ST5, the control computer 2 sends the control signals S2 to the stepping motor which drives the intermittent feed roller 52 and to stepping motor which drives the discharging feed rollers 56 and 57. The stepping motors are driven to feed the hologram recording medium 30 by the amount corresponding to an element hologram. After the hologram recording medium 30 is fed, the operation is left in a standby state until vibration is reduced (step ST6).

The routine then returns to step ST3, where the control computer 2 drives the display device 41 on the basis of the next image data D5 supplied from the data processor 1 and causes the next image to be displayed on the display device 41. By repeating the operation of steps ST4 to ST6, each image on the basis of the image data D5 supplied from the data processor 1 is sequentially recorded on the hologram recording medium 30 as strip-shaped element holograms.

That is, in the holographic stereogram generation system, an image on the basis of the image data recorded on the storage unit 12 is sequentially displayed on the display device 41. At the same time, the shutter 32 is opened for each image and each image is sequentially recorded on the hologram recording medium 30 as strip-shaped element holograms. Since the hologram recording medium 30 is fed by an amount corresponding to one element hologram for each image, the element holograms are arranged continuously in a horizontal direction (transverse direction) when observed. Accordingly, the image of the horizontal parallax information is recorded on the hologram recording medium 30 as plural element holograms which continue in the transverse direction. In this manner, a holographic stereogram having a horizontal parallax can be obtained.

In the foregoing, processes to the exposure process have been described. If necessary, a post-process (step ST8) is performed to complete the printing step. If UV irradiation and heating are necessary for the photopolymer, an equipment configuration as illustrated in FIG. 7 can be employed. That is, the UV lamp 54 emits UV ray to complete the polymerization of the monomers M. Subsequently, the hologram recording medium 30 is heated by the heat roller 55 and therefore the recorded image is fixed.

When all the areas on which the image is recorded are discharged, the control computer 2 supplies the control signal S2 to the cutter driving mechanism so as to drive the same. The cutter 58 cuts the areas on which the image is recorded in the hologram recording medium 30 and the cut areas are discharged as a single holographic stereogram. In this process, the holographic stereogram which has the horizontal parallax is completed.

2. First Embodiment

Configuration of Replication Device

Figure 9:
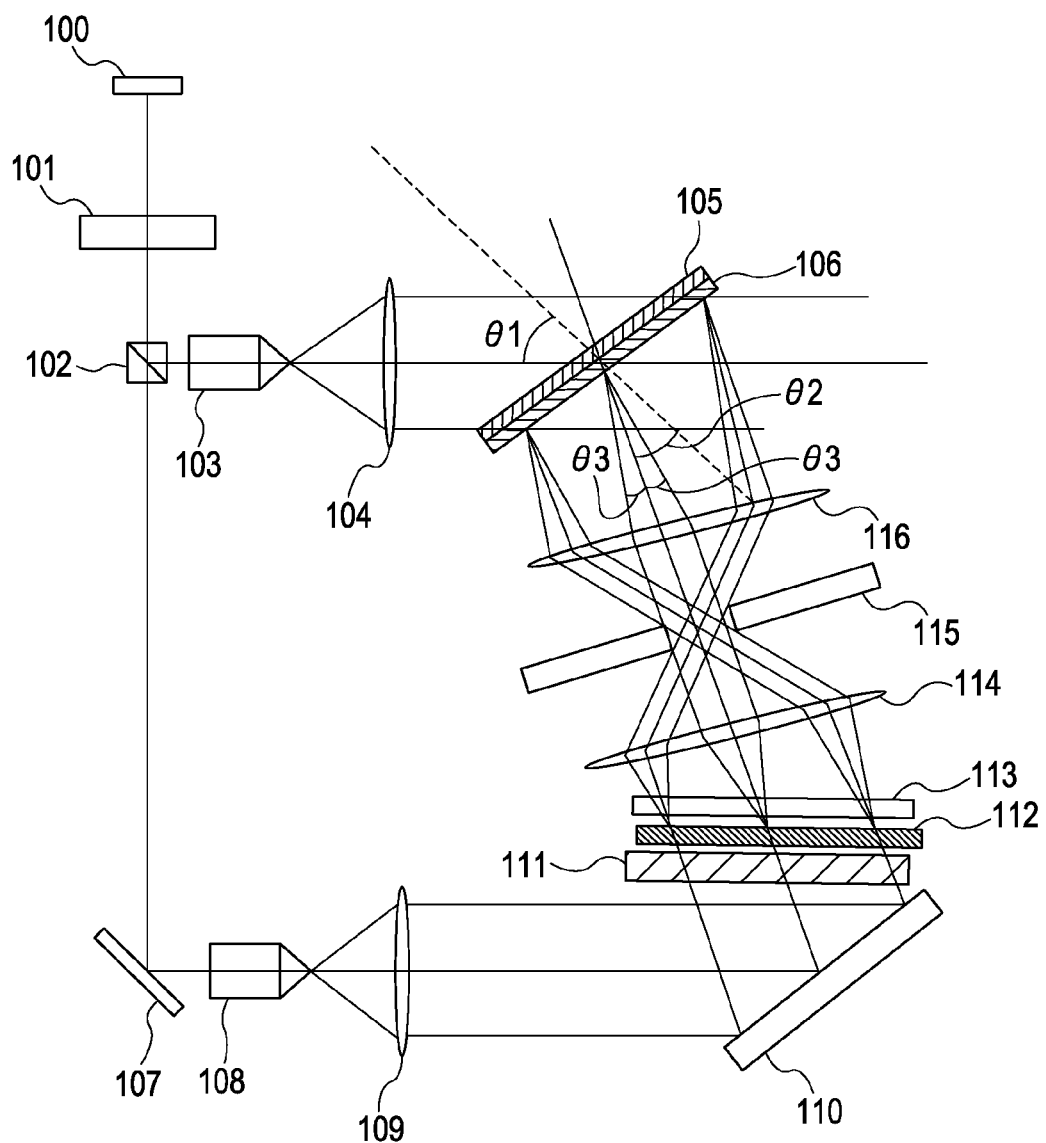
FIG. 9 is a schematic diagram illustrating a configuration of a replicating device according to a first embodiment of the invention.

A first embodiment of the invention is configured as illustrated in FIG. 9. A laser beam from a laser light source 100 is incident on a polarized beam splitter 102 via a ½ wavelength plate 101. The ½ wavelength plate 101 rotates the polarization plane of the laser beam by 90°. The laser beam (i.e., S polarized light) is reflected by the polarized beam splitter 102 and the laser beam is expanded by a spatial filter 103. The laser beam (i.e., reference light) from the spatial filter 103 is incident on a collimation lens 104. A hologram recording medium 105 having a photosensitive material layer and a hologram master 106 are irradiated with parallel laser beams collimated by the collimation lens 104.

The hologram master 106 is a holographic stereogram which is generated as described above and which has parallax in both the horizontal and vertical directions when observed. The hologram master 106 may be a holographic stereogram which has only horizontal parallax. Alternatively, the hologram master 106 may be an actually captured hologram generated by irradiating an object with a laser beam. The hologram recording medium 105 and the hologram master 206 are brought into close contact with each other directly or with a refractive index adjusting liquid (also called an index matching liquid) therebetween. Interference fringes formed by the light diffracted by the hologram master 106 and the reference light and interference fringes formed by the additional information light and the reference light are recorded in the hologram recording medium 105.

A laser beam (i.e., P polarized light) transmitted by the polarized beam splitter 102 is reflected by mirror 107 and is incident on the spatial filter 108. The laser beam expanded by the spatial filter 108 is converted into parallel beams by the collimation lens 109 and the parallel beams are incident on the mirror 110.

The laser beam reflected by the mirror 110 is incident on the liquid crystal panel 112 serving as a spatial light modulation element via the diffuser plate 111. The diffuser plate 111 extends a viewing angle of the holographic stereogram to be replicated by increasing the dimensions of the laser beam from the mirror 10 in at least one of the width direction and the longitudinal direction of the element hologram. The laser beam diffused by the diffuser plate 111 is narrowed by a diaphragm (i.e., a mask) 115 and its viewing angle is increased only when observed from the front.

Although not illustrated, a liquid crystal driving section, e.g., a microcomputer, is connected to the liquid crystal panel 112. An image of the additional information is displayed on the liquid crystal panel 112 by the liquid crystal driving section. The additional information may include identification information, such as unique numbers (i.e., serial numbers) with respect to each of the holograms. The polarizing plate 113 is provided on an emission surface of the liquid crystal display panel 112. The polarizing plate 113 rotates the polarization plane surface to convert a P wave into an S wave.

Additional information light generated by the liquid crystal display panel 112 and transmitted by the polarizing plate 113 is incident on the hologram master 106 via an image formation optical system which includes a projection lens 114, a diaphragm 115 and a projection lens 116. Interference fringes formed by superimposed light of the light diffracted by the hologram master 106 and the additional information light transmitted the hologram master 106 and by incidence laser beam is recorded in the hologram recording medium 105. Accordingly, additional information can be recorded in a hologram area of the hologram master 106. The optical element disposed on the optical path extending from the mirror 110 to the hologram recording medium 105 is attached to a predetermined position by a support member, such as a rail.

Viewing Angle

Figure 10A:
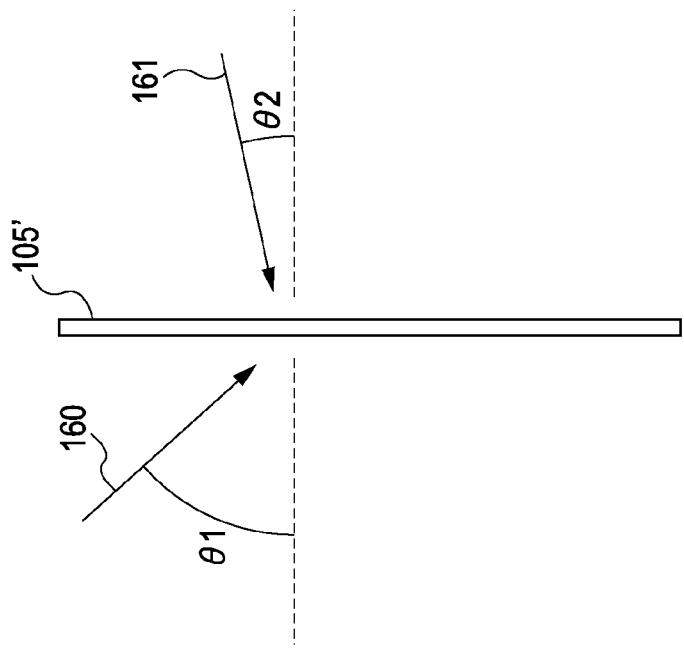
FIGS. 10A and 10B each are a schematic diagram illustrating general viewing angles.

A typical relationship between recording in the hologram recording medium 105 and a viewing angle during reproduction from the recorded hologram recording medium 105 will be described with reference to FIGS. 10A and 10B. As illustrated in FIG. 10A, at the time of recording, the reference light 160 is incident at an incidence angle $\theta 1$ with respect to the hologram recording medium 105' and the object light 161 is incident at an incidence angle $\theta 2$ from the opposite side of the hologram recording medium 105'. Interference fringes formed by the object light 161 and the reference light 160 is recorded on the hologram recording medium 105'.

Figure 10B:
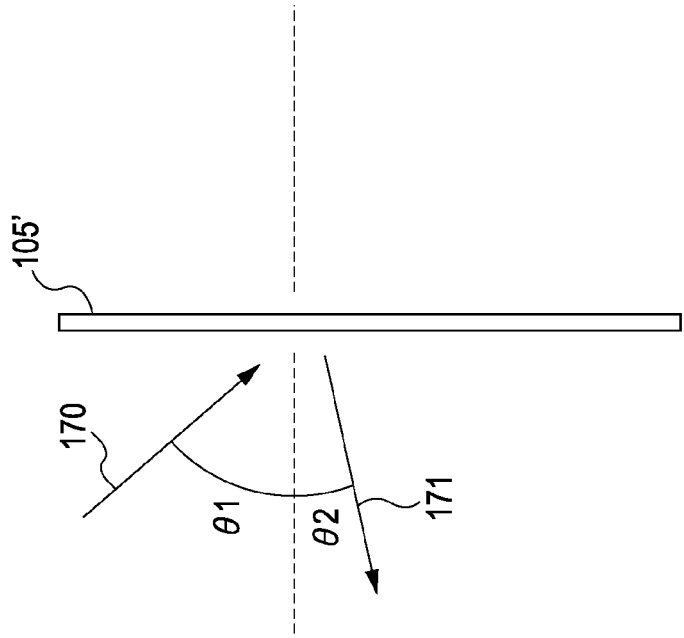

As illustrated in FIG. 10B, when the thus-recorded hologram recording medium 105' is irradiated with illumination light 170 at an incidence angle $\theta 1$, object light (i.e., reproduced light) 171 is emitted at an emitting angle $\theta 2$ from the hologram recording medium 105'. Accordingly, a viewer can view the object light from a viewpoint on line of extension of the object light 171.

Figure 11:
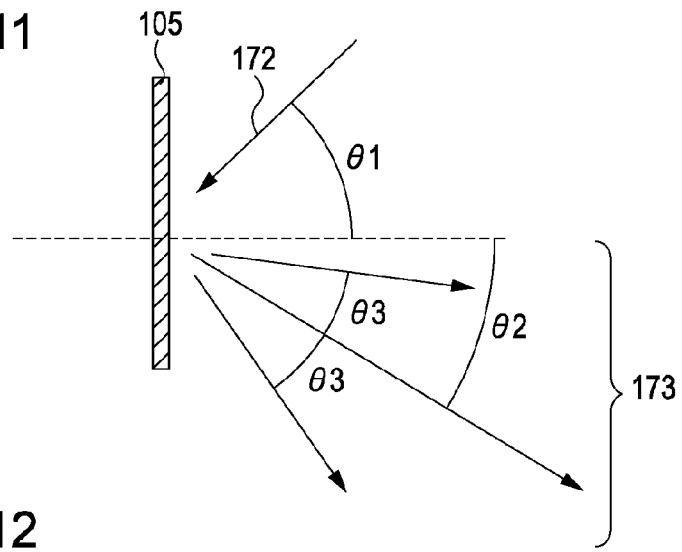
FIG. 11 is a schematic diagram illustrating a viewing angle in the first embodiment of the invention.

As illustrated in FIG. 9, in an embodiment of the invention, the reference light is incident on the hologram recording medium 105 at the incidence angle $\theta 1$ and additional information light is incident at the incidence angle θ2 with respect to the hologram recording medium 105. The additional information light has a diffusion angle of ±θ3 made by the diffuser plate 111 and the diaphragm 115 disposed close to the liquid crystal panel 112. At the time of reproduction, as illustrated in FIG. 11, reference light 172 is incident on the replicated hologram recording medium 105 at the incidence angle θ1. Additional information light 173 reproduced by the hologram recording medium 105 is expanded to ±θ3 from the emitting angle θ2. That is, the additional information can be observed only when the viewpoint is in a range of ±θ3 from the emitting angle θ2. The diffusion angle ±θ3 can be arbitrarily changed in accordance with the specification of the approaching diffuser plate. If the hologram is reproduced, however, with an intensity distribution in which the intensity becomes the largest at a certain center and becomes gradually smaller as the distance from the center becomes larger, the hologram can be observed in a different manner from a switching hologram recorded in two steps.

In the embodiment of the invention, the central angle of the viewpoint at which the additional information image can be observed when the replicated hologram recording medium 105 is reproduced can be determined by using the incidence angle θ2 made by the optical axis of the additional information light with respect to the hologram recording medium 105. A range of the viewpoint at which the additional information image during reproduction can be observed is defined by controlling expansion of the light flux of the additional information light by the image formation optical system which includes the projection lenses 114 and 116 and the diaphragm 115.

As described above, the hologram recording medium 105 replicated by using the replication device according to an embodiment of the invention has the following characteristics. With the recording medium 105, a viewer can observe the hologram image and the additional information image independently from each other by moving his or her viewpoint. The viewpoint is moved by both moving the observing eye and moving the hologram recording medium. A hologram image is reproduced which has parallax continuing at least in the horizontal direction when the viewpoint is moved to the right and left with respect to the normal line when illuminated at a predetermined angle and has a controlled viewing angle in the vertical direction. It is not necessary to control the viewing angle in the vertical direction. The refractive index modulation is recorded in the material of a single layer such that, when the viewpoint is moved relatively in at least one of the vertical and horizontal directions with respect to the normal line of the hologram recording medium, another image (i.e., an additional information image) that is not continuous to the hologram image may be reproduced.

The hologram image is a hologram having an image recorded therein or a holographic stereogram. As a hologram reproduced from another angle in at least one of the vertical and horizontal directions is a 2D image positioned at the substantially fixed plane along the depth direction. The 2D image positioned at the substantially fixed plane along the depth direction is the additional information image which has the identification information.

The depth at which the 2D image is to be positioned can be arbitrarily determined in accordance with the image processing or a position of the diffuser plate. By positioning the 2D image at different depth from that of the hologram on which the image is recorded or the holographic stereogram, the viewer can easily distinguish and recognize the image and the 2D image (i.e., the identification information). Since sharpness deteriorates with irradiation of light from a diffused light source at a greater distance from the plane, the 2D image is designed to be positioned at a proper depth, e.g., about 2 mm. It was found that the 2D image is easy to observe at that position.

According to an embodiment of the invention, an additional information image (i.e., serial numbers and machine-readable bar code information) can be recorded in the hologram area. Since the range of the viewpoint from which the additional information image can be observed is able to be defined, the additional information image can be prevented from interfering with the observation of the hologram image.

In an embodiment of the invention, the hologram having an image recorded therein is acquired by a one-step recording of a holographic stereogram as described above. Although an actually captured hologram obtained by irradiating a model with laser can be used in the invention, the one-step holographic stereogram recording is advantageous to authentification. In particular, when the element hologram in the one-step holographic stereogram is configured as a 0.1 mm-side strip-shaped rectangle, the 0.1 mm-side strip-shaped rectangle and dark sections are seen when magnified with a magnifying glass. The 2D image, which is the identification information, has no strip-shaped rectangle. The fact that the image is divided into areas and has continuous identification information is a clear characteristic and is important in defining the hologram recorded in accordance with the invention.

First Modified Embodiment of First Embodiment

Figure 12:
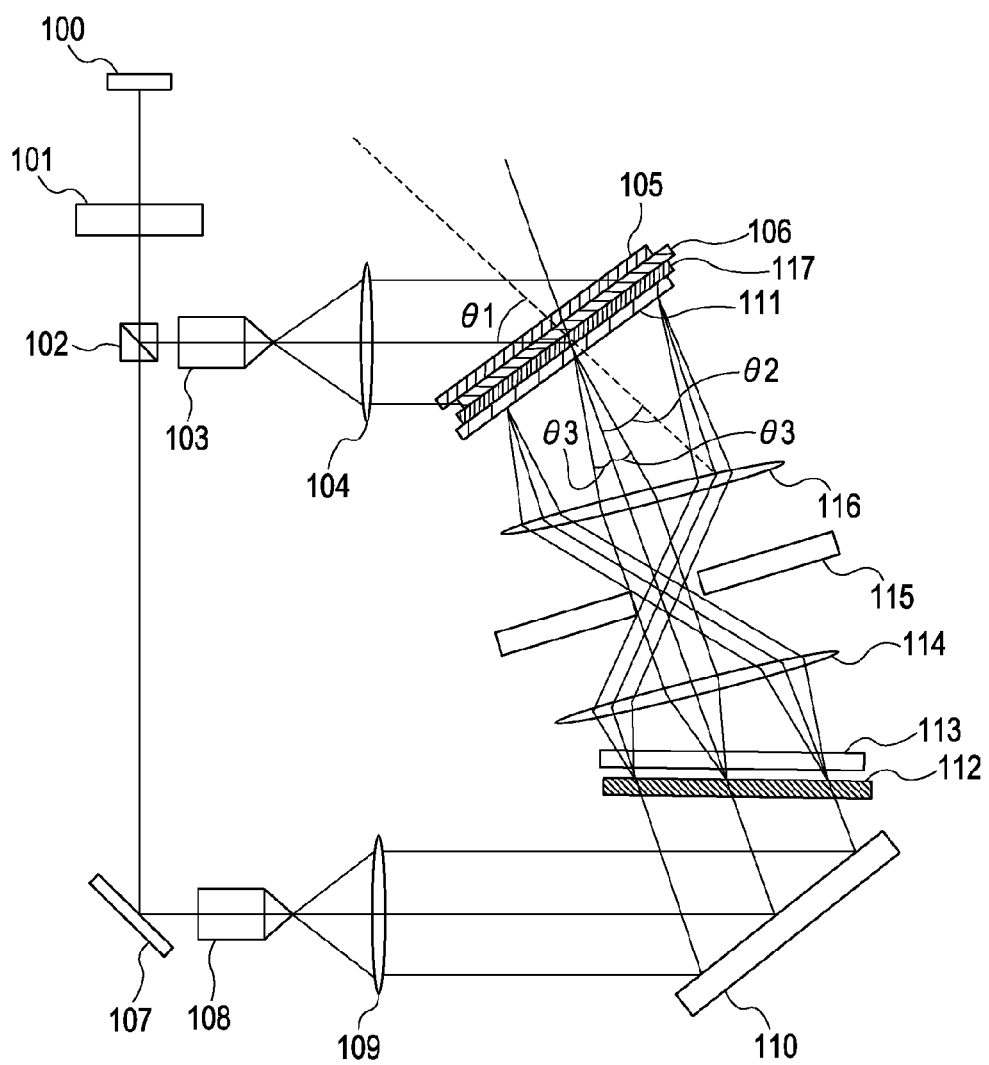
FIG. 12 is a schematic diagram illustrating a configuration of a first modified embodiment of the first embodiment of the invention.

The diffuser plate 111 may be disposed at the side at which the light from the projection lens 116 is incident so long as the positions are optically equivalent to each other as illustrated in FIG. 12. In this case, the visual field range for the additional information light can be controllable by the diffusion angle of the diffuser plate. In the configuration illustrated in FIG. 12, the louver 117 is disposed between the diffuser plate 111 and the hologram master 106. The louver 117 prevents unnecessary lights, such as reflected light, from being incident upon the hologram master 106. The louver 117 has black-colored planar absorption layers disposed inside the transparent plate at constant intervals. The additional information light and the diffusing components thereof are allowed to transmit the absorption layer of the louver 117. The parallel beams for replication which has passed the collimation lens 104 are not allowed to transmit the absorption layer of the louver 117.

Second Modified Embodiment of First Embodiment

As described above, when imaging the additional information image by the liquid crystal panel 112 near the hologram master 106 on the entire surface with an optical axis optical system away from the normal line, it is necessary to incline the display surface of the liquid crystal panel 112 toward the surface of the hologram master 106. Since the liquid crystal panel 112 is not designed supposing incidence from inclined angles, decline in efficiency for light utilization, decline in uniformity and increase in scattering may be caused.

Figure 13:
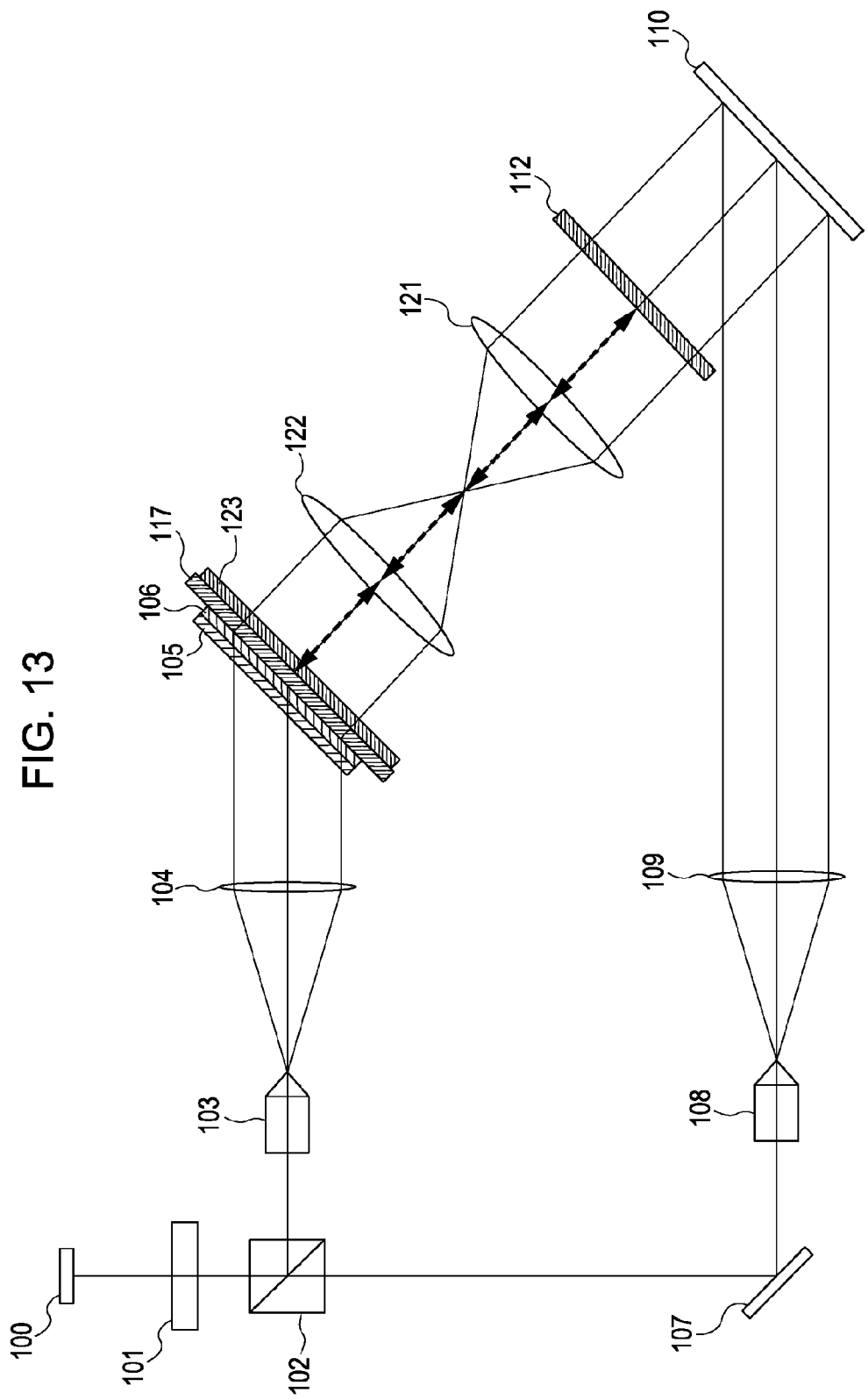
FIG. 13 is a schematic diagram illustrating a configuration of a second modified embodiment of the first embodiment of the invention.

An exemplary replication device illustrated in FIG. 13 can solve such a problem. That is, the display surface of the liquid crystal panel 112 (including the polarizing plate 113) and the surface of the hologram master 106 are arranged in parallel. As illustrated in FIG. 13, the additional information light is incident on the hologram master 106 via a projection lens 121, a projection lens 122, a light-polarizing sheet 123 and a louver 117.

Figure 14A:
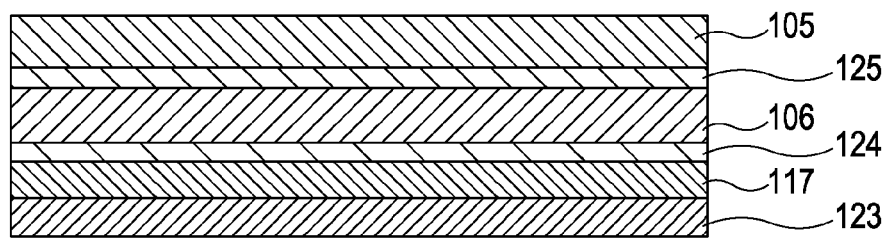
FIGS. 14A and 14B each are a schematic diagram illustrating a partial configuration of the second modified embodiment of the first embodiment of the invention.
Figure 14B:
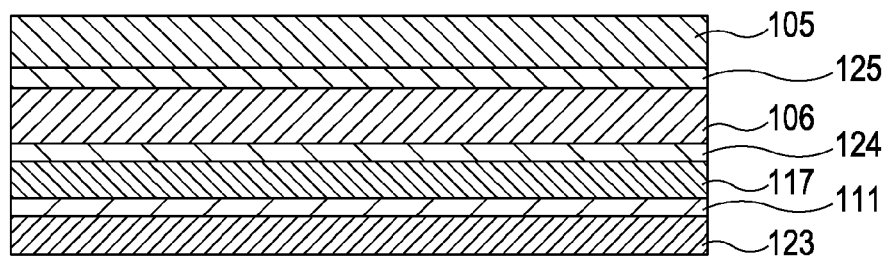

As illustrated in FIG. 14A, a louver 117 is laminated on the hologram master 106 via an adhesion layer 124 and the hologram recording medium 105 is laminated on the hologram master 106 via an adhesion layer 125. Examples of the light-polarizing sheet 123 include a holographic optical element, s diffraction optical element and an angle of refraction control prism sheet. The light-polarizing sheet 123 deflects the additional information light in the predetermined direction (i.e., incidence angle). As illustrated in FIG. 14B, it is also possible to extend viewing angle moderately by disposing a diffuser plate 111 near the light-polarizing sheet 123. The light-polarizing sheet 123 is provided to eliminate the optical path difference and to create a situation in which focusing can be conducted easily over the entire surface.

Control of viewing Angle

Although it is possible to control the viewing angle by an angle in accordance with a designed value, the following angles are preferred in order to provide a more easy-to-observe and bright hologram. The angle of the reference light is defined as θ with respect to a normal line of the hologram surface, an angle at which the 2D image is reproduced with maximum luminance in the vertical direction with respect to the normal line of the hologram surface is defined as φ, and an angle at which the hologram having an image recorded therein or the holographic stereogram are reproduced with maximum intensity is defined substantially (θ+φ)/2. Alternatively, the angle of the reference light is defined as θ with respect to a normal line of the hologram surface, an angle at which the 2D image is reproduced with maximum luminance in the vertical direction with respect to the normal line of the hologram surface is defined as φ, and an angle at which the hologram having an image recorded therein or the holographic stereogram are reproduced with maximum intensity is defined substantially (θ−φ)/2. As an example in which one hologram image and one 2D image are included, the angle of the reference light is defined as θ with respect to a normal line of the hologram surface, an angle at which the 2D image is reproduced with maximum luminance in the vertical direction with respect to the normal line of the hologram surface is defined as −θ/3±θ/3, and an angle at which the hologram having an image recorded therein or the holographic stereogram are reproduced with maximum intensity is defined substantially +θ/3±θ/3. Accordingly, the distance from the reference light to each of the maximum luminance angles of the images becomes constant, which may record an efficient image. Similarly, the angle of the reference light is defined as θ with respect to a normal line of the hologram surface, an angle at which the 2D image is reproduced with maximum luminance in the vertical direction with respect to the normal line of the hologram surface is defined as +θ/3±θ/3, and an angle at which the hologram having an image recorded therein or the holographic stereogram is reproduced with maximum intensity is defined substantially −θ/3±θ/3.

Figure 15A:
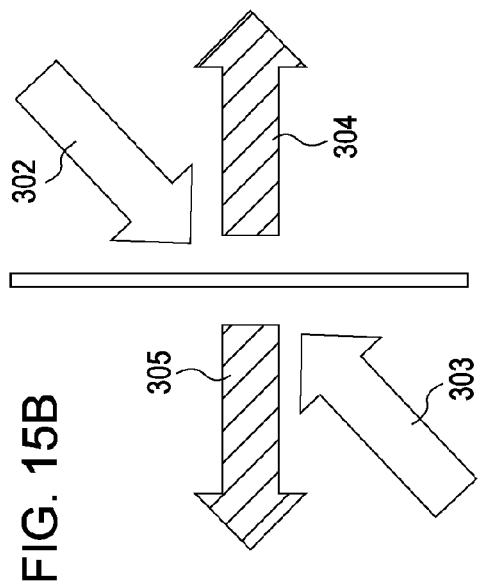
FIGS. 15A to 15D each are a schematic diagram used illustrating viewing angles of a general hologram.

Reasons why these angles are preferred will be described with reference to FIGS. 15A to 17B. FIG. 15A illustrates an exemplary recording of a reflection hologram of two-light flux parallel beams. An incidence angle of the reference light from a direction 301 is set to)(θ=45°) and an incidence angle of the object light from a direction 300 is set to 180°.

Figure 15B:
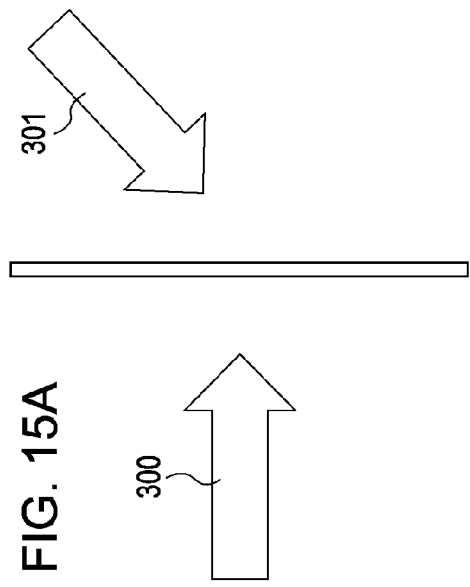
Figure 15C:
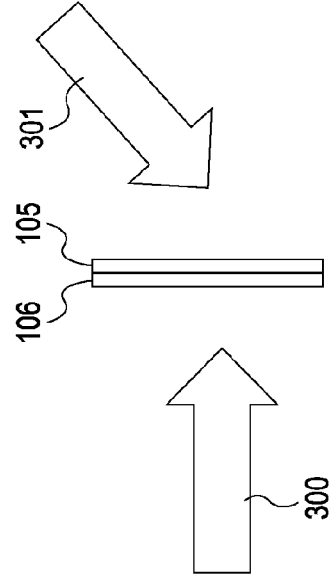

The recorded hologram is illuminated and reproduced as illustrated in FIG. 15B. As in the reference light, when the hologram is irradiated with illumination light from a direction 302, diffracted light is emitted in a direction 304. When the illumination light is incident in from a direction 303 which is at 180° from the direction 302, diffracted light is emitted in a direction 305. In this case, a pseudoscopic image (i.e., an image having reversed depth from an actual 3D image) is reproduced. As illustrated in FIG. 15C, when the hologram is irradiated with illumination light from a direction 308, diffracted light is emitted in a direction 306 by the conditions of Bragg diffraction. When the hologram is irradiated with illumination light from a direction 309, diffracted light is emitted in a direction 307 and a pseudoscopic image is reproduced.

Figure 15D:
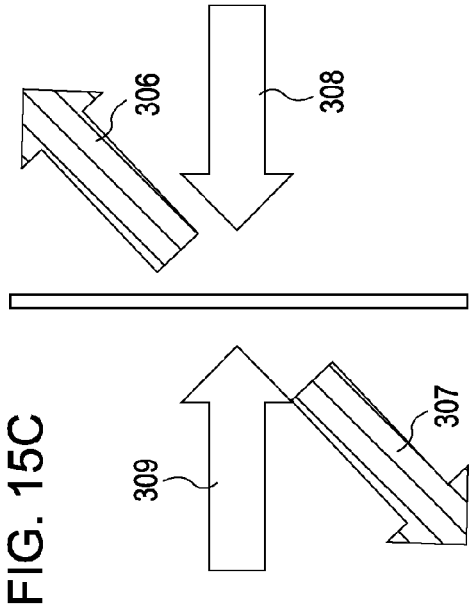

In the invention, as illustrated in FIG. 15D, it is necessary to cause the hologram master 106 and an object to be exposed (i.e., a hologram recording medium) 105 to be optically in close contact with each other and the reference light to be incident from the direction 301 for replication. When a 2D image is to be recorded from the direction 200, if the hologram master 106 has an image therein, the hologram in the hologram master 106 may cause diffraction illustrated by diffracted light in FIG. 15C or FIG. 15D. As a result, the laser for recording the 2D identification image (i.e., the additional information) does not reach the object to be exposed 105. Even if the laser reaches the object to be exposed 105, there is also a problem that the image of the hologram master 106 may cause variation in intensity of the 2D image. The light from the direction 300 is not parallel beams but actually is focused light, which may be affected by the variation in intensity. It is therefore necessary to select an angle with the least influence of the variation in intensity.

Figure 16A:
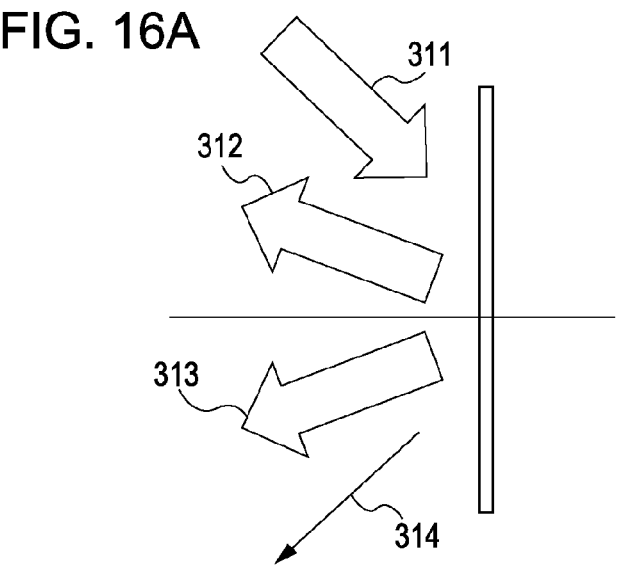
FIGS. 16A to 16C each are a schematic diagram illustrating a viewing angle control according to an embodiment of the invention.

In the invention, as illustrated in FIG. 16, the angle for replication (i.e., recording) is selected in consideration of this fact. As illustrated in FIG. 16A, the reference light is incident from a top left direction 311 at an angle of 45°. If the image is switched into two along the vertical direction, a top left direction 312 at an angle of 15° and a bottom left direction 313 at an angle of 15° are defined as image reproduction angles. In this case, the angle between the reference light and the switching along an upward direction is 30° and a difference of the image reproduction angles in the vertical direction is also 30°, which is apart from the direction 314 of regular reflection of the reference light by 30°. Such an angle relationship is easy to observe. The regular reflection is an angle of mirror reflection of the reference light, which becomes difficult to view when the hologram is irradiated by light from a light source, the hologram image and the light source are observed at the same time.

Figure 16B:
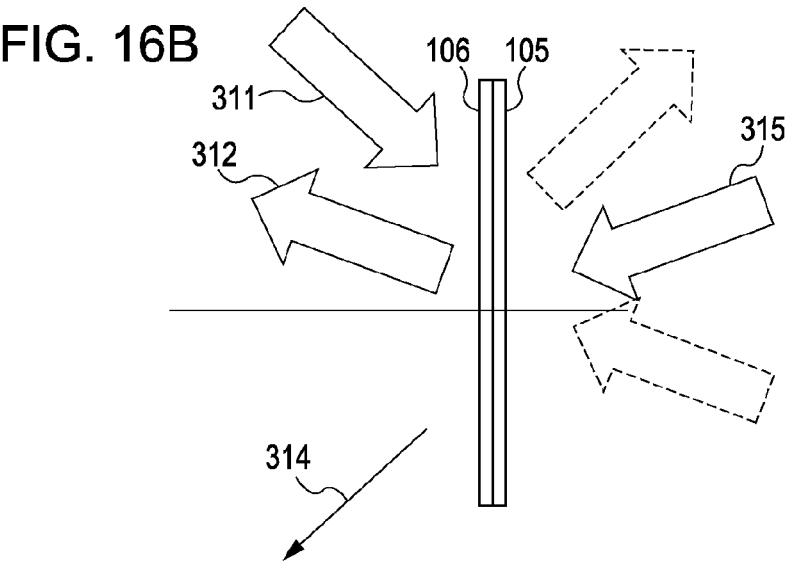
Figure 16C:
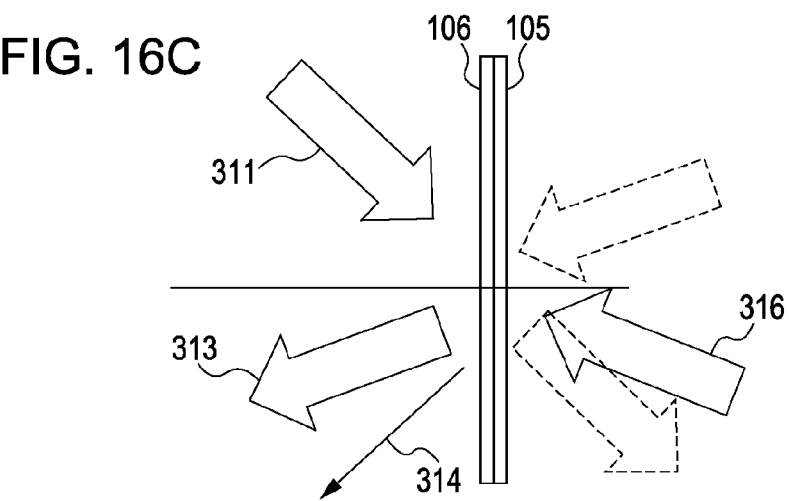

If the first image reproduced at an angle of the direction 312 is used as the hologram master 106, an incidence angle of the identification information light is set to an angle 315 as illustrated in FIG. 16B. Light along a direction represented by a dashed line is the light diffracted by Bragg diffraction. If the second image reproduced at an angle of the direction 313 is used as the hologram master 106, an incidence angle of the identification information light is set to an angle 316 as illustrated in FIG. 16C. Light along a direction represented by a dashed line is the light diffracted by Bragg diffraction.

Figure 17A:
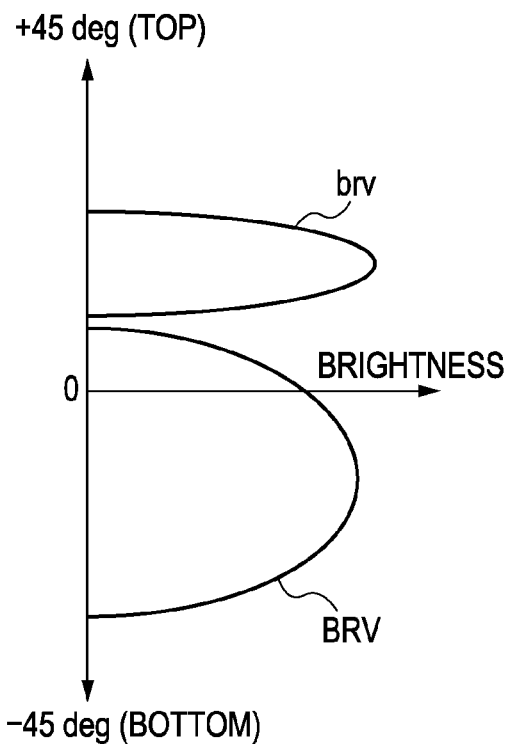
FIGS. 17A and 17B each are a schematic diagram illustrating a viewing angle control according to an embodiment of the invention.
Figure 17B:
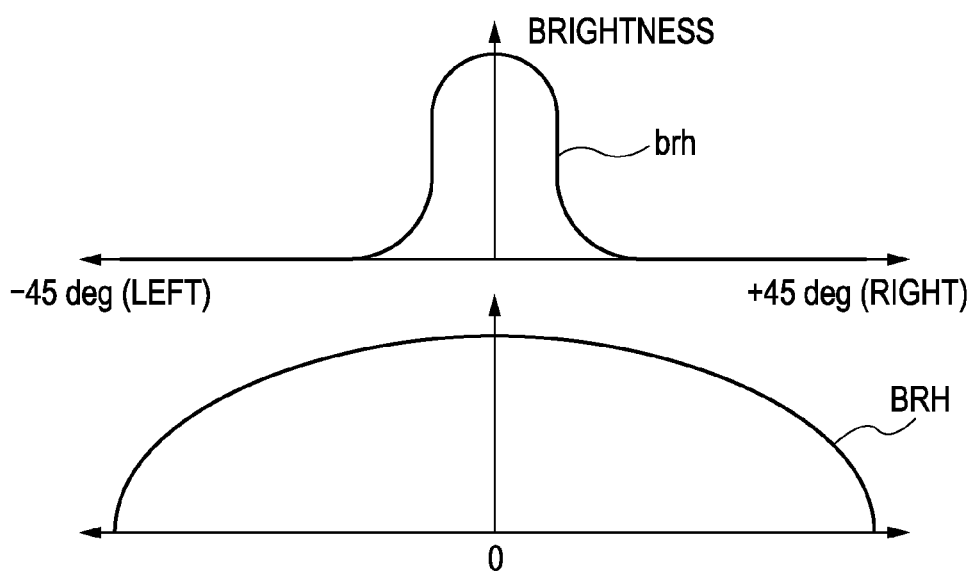

Accordingly, a viewer of the hologram recording medium 105 replicated in accordance with an embodiment of the invention can observe the hologram image and the additional information image independently to each other by moving the viewpoint, as illustrated in FIG. 17. FIG. 17A illustrates an example when the viewpoint is moved vertically and FIG. 17B illustrates an example when the viewpoint is moved horizontally. Movement of the viewpoint can be achieved by rotating the hologram recording medium or moving the eye observing the hologram recording medium. For example, the viewpoint can be vertically moved by fixing the hologram recording medium and moving the observing eye up and down in a range of ±45° with respect to the normal line drawn from the hologram recording medium. Alternatively, the viewpoint can be vertically moved by fixing the observing eye on the normal line and rotating the hologram recording medium in a range of ±45° about the horizontal axis. The viewpoint can be moved horizontally by fixing the hologram recording medium and moving the observing eye left and right in a range of ±45° with respect to the normal line drawn from the hologram recording medium. Alternatively, the viewpoint can be moved horizontally by fixing the observing eye on the normal line and rotating the hologram recording medium in a range of a predetermined angle, e.g., ±45° about the vertical axis.

In FIG. 17A, BRV represents the luminance change of the hologram image when the viewpoint is moved vertically and brv represents the luminance change of the 2D image when the viewpoint is moved vertically. In FIG. 17B, BRH illustrates luminance change of hologram image at the time of moving viewpoint horizontally and brh illustrates luminance change of 2D image at the time of moving viewpoint horizontally. As illustrated in FIG. 17, when the hologram recording medium is illuminated from a predetermined angle and the viewpoint is moved horizontally, a hologram image having continuous parallax in the horizontal direction and a controlled viewing angle in the vertical direction is reproduced. When the viewpoint is moved relatively in the vertical direction with respect to the normal line of the hologram recording medium, another image (i.e., a 2D image) that is different from and thus is not continued from the hologram image will be reproduced. In the described example, if the angle of the reference light θ=45° and parallax hologram image φ=−15° in the vertical direction, the brightness of the 2D image becomes larger at a viewpoint of (θ+φ)/2=(45−15)/2=15°. In the horizontal direction, the 2D image can be seen in the range of (0°±15°). If the angle of the reference light θ=45° and the parallax hologram image φ=15°, an easy-to-observe 2D image can be obtained with (φ−θ)/2=(15−45)/2=−15°. If the angle of the reference light θ=45° and the parallax hologram image parallax hologram image, and if (θ+φ)/2=(45−0)/2=22.5° or (φ−θ)/2=(0−45)/2=−22.5°, an easy-to-observe and easy-to-manufacture 2D image can be obtained as described above.

The angles defined in the invention are typical examples, and thus various modifications can be made in accordance with whether the hologram image of the additional information is to be mainly observed. The image is not necessarily divided into two along the vertical direction. It is also possible to add several pieces of parallax information along the lengthwise direction in the hologram master in advance and to add the additional information to the angles which do not overlap the angle. For example, when a parallax hologram image having the reference light of 45° is recorded at two different angles of +22.5° and 0°, and the 2D image is recorded at an angle of −22.5°, a satisfactory hologram recording was obtained. Similarly, when a parallax hologram image having the reference light of 45° is recorded at two different angles of +22.5° and 0°, and the 2D image is recorded at an angle of 22.5°, a satisfactory hologram recording was obtained.

3. Second Embodiment

Replication Device

Figure 18:
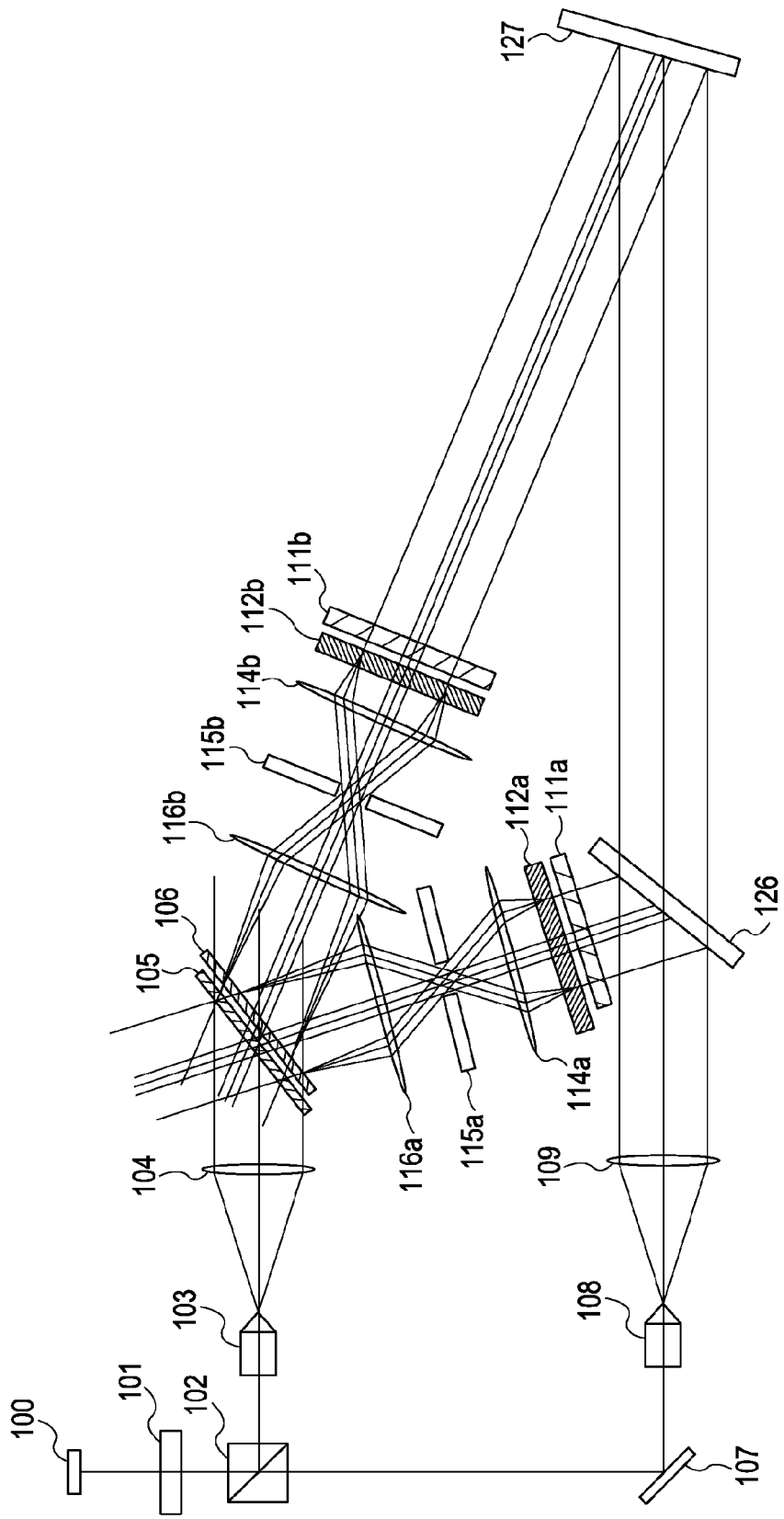
FIG. 18 is a schematic diagram illustrating a configuration of a replicating device according to a second embodiment of the invention.

As illustrated in FIG. 18, the polarized beam splitter 102 separates the reference light from the laser beam and the reference light is incident on the hologram recording medium 105 via the spatial filter 103 and the collimation lens 104. The branched laser beam is reflected by the mirror 107 and is incident on the half mirror 126 via the spatial filter 108 and the collimation lens 109.

The laser beam reflected by the half mirror 126 is converted into a first branched laser beam. The laser beam transmitted the half mirror 126 is incident on the mirror 127. The laser beam reflected by the mirror 127 is converted into a second branched laser beam. As in the first embodiment, the first branched laser beam is incident on a liquid crystal panel 112a (including a polarizing plate) via a diffuser plate 111a. An additional information image of the liquid crystal panel 112a is imaged on the hologram recording medium 105 via an image formation optical system (i.e., projection lenses 114a and 116a and a diaphragm 115a) and the hologram master 106.

The second branched laser beam is incident on a liquid crystal panel 112b (including a polarizing plate) via a diffuser plate 111b. An additional information image of the liquid crystal panel 112b is imaged on the hologram recording medium 105 via an image formation optical system (i.e., projection lenses 114b and 116b and a diaphragm 115b) and the hologram master 106. The incidence angle of the additional information light generated from the first branched laser beam with respect to the hologram recording medium 105 differs from the incidence angle of the additional information light generated from the second branched laser beam with respect to the hologram recording medium 105. It is therefore possible that the viewpoint from which the additional information image by the liquid crystal panel 112a can be observed differs from the viewpoint from which the additional information image by the liquid crystal panel 112b can be observed. With this configuration, two different additional information images can be observed depending on the viewpoints.

The hologram recording medium 105 is irradiated with two branched laser beams at the same time. However, the hologram recording medium 105 may alternatively be irradiated with two branched laser beams in time sequence. Three or more branched laser beams may also be used.

4. Third Embodiment

Replication Device

In the first and the second embodiments, the reference light for contact printing is branched and used for multiplex recording of the additional information. Alternatively, the additional information may be recorded using a laser beam other than that for contact printing, as illustrated in FIG. 19.

Figure 19:
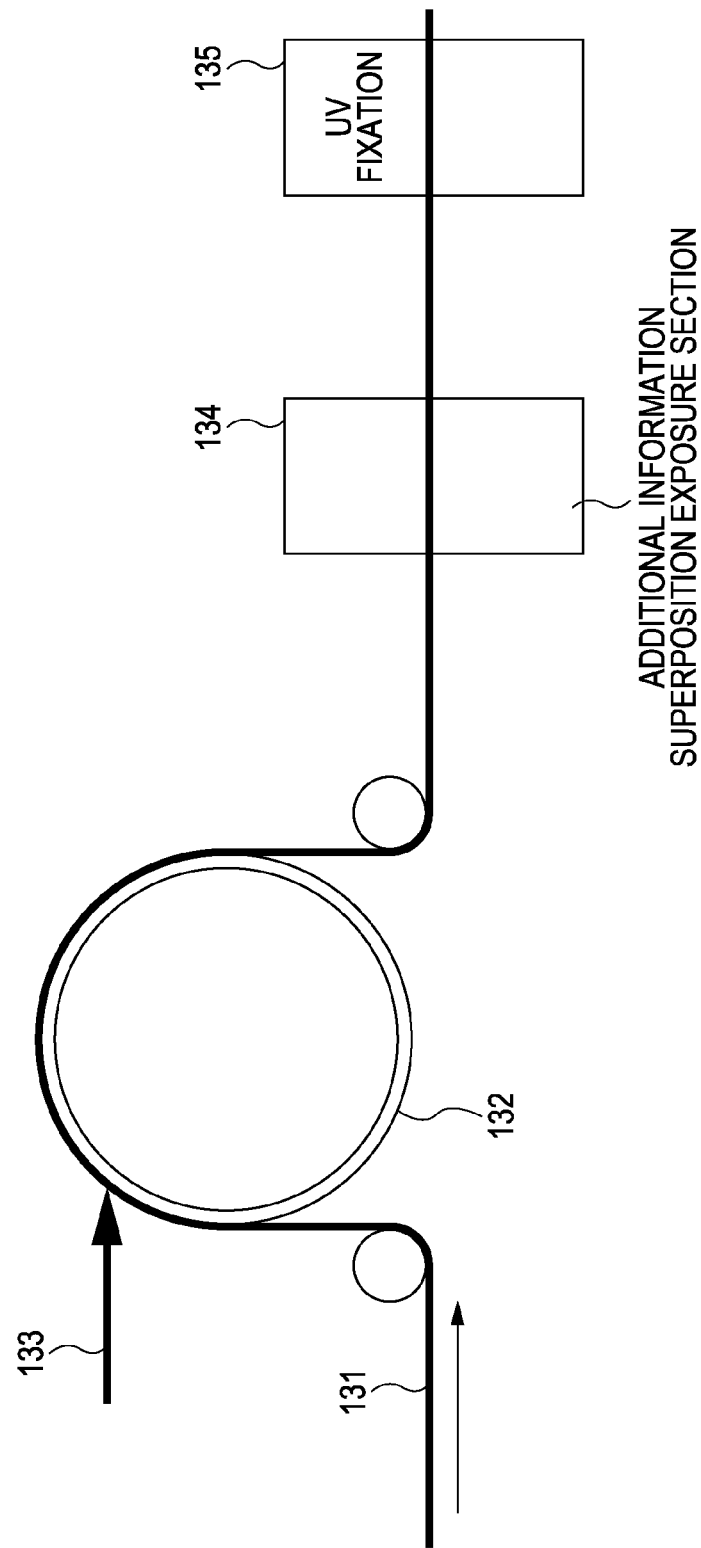
FIG. 19 is a schematic diagram illustrating a configuration of a replicating device according to a third embodiment of the invention.

In an example illustrated in FIG. 19, the additional information is recorded after the contact printing and before fixing in a UV fixing section 135. A hologram recording film 131 taken out of a roller, which is not illustrated, is taken up on a peripheral surface of the roller. The hologram recording film includes a transmissive base film with a photosensitive material applied therein. A hologram master 132 is attached on the peripheral surface of the roller. The hologram master 132 is, for example, a horizontal continuous parallax image. The hologram master 132 and the hologram recording film 131 are brought into close contact with each other and then irradiated with a laser beam for replication 133. In this manner, a hologram of the hologram master 132 is replicated on the hologram recording film 131.

Replication is conducted when the hologram recording film 131 is fed. At the same time when feeding of the hologram recording film 131 is stopped, a shutter, not illustrated, of the laser for duplication 133 is closed and the laser for replication 133 is irradiated. After the replication, the hologram recording film 131 is fed to an additional information superposition exposure section 134 where the additional information is recorded. A configuration for recording the additional information may be similar to that of the replication device described above. The hologram recording film 131 subject to replication and having the additional information recorded therein is fed from the additional information superposition exposure section 134 to the UV fixing section 135. Alternatively, the additional information may be recorded first, the hologram may then be contact printed and fixed.

5. Fourth Embodiment
Replication Device

Figure 20:
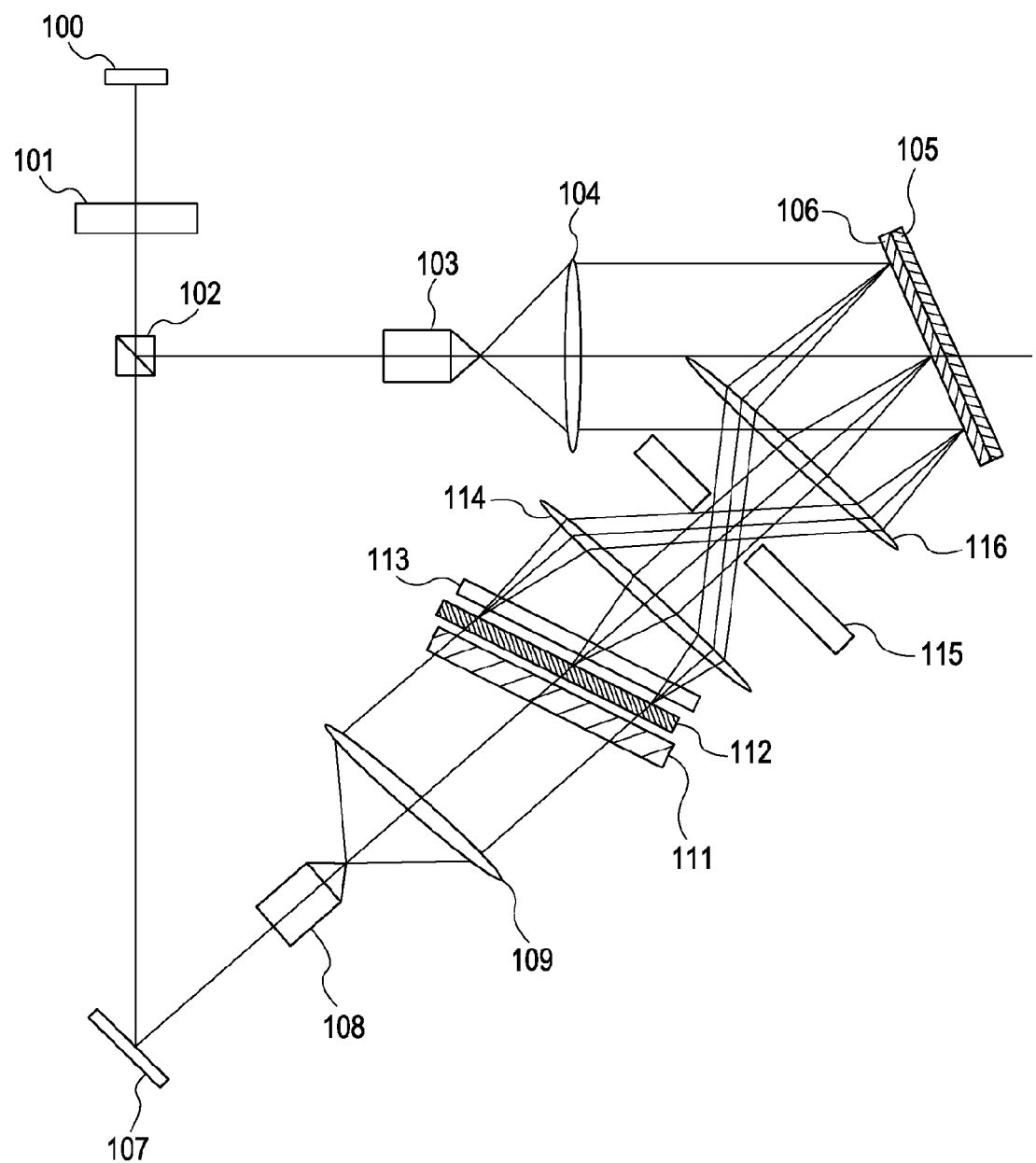
FIG. 20 is a schematic diagram illustrating a configuration of a replicating device according to a fourth embodiment of the invention.

In the foregoing embodiments, the reflection hologram is used as a hologram master. The invention, however, may also be applied to an embodiment in which a transmission hologram is used as a hologram master. The hologram master 106 and the hologram recording medium 105 are in close contact with each other as illustrated in FIG. 20. The reference light is separated by the polarized beam splitter 102 and is incident on the hologram master 106 via the spatial filter 103 and the collimation lens 104.

The laser beam reflected by the mirror 107 is incident on the liquid crystal panel 112 via the spatial filter 108, the collimation lens 109 and the diffuser plate 111. Additional information light from the liquid crystal panel 112 is incident on the hologram master 106 via the polarizing plate 113 and a coupling optical system (i.e., projection lenses 114 and 116 and a diaphragm 115). The hologram of the hologram master 106 and the additional information image are recorded in a superimposed manner on the hologram recording medium 105.

6. Fifth Embodiment

A fifth embodiment of the invention improves separatability of a 2D image (i.e., additional information) from a hologram image by reproducing both of them with different colors. Statistics were taken from thirty subject persons regarding whether or not the images were color-separated and thus were easy to observe when illuminated with white light. As a result, the images were easy to observe when the reproduction peak wavelengths are separated by, for example, not less than 25 nm.

Several methods may be employed to change the colors of the additional information and the image hologram. Examples thereof include multiple exposure with varying wavelengths of the laser beam used for recording. As illustrated in FIG. 21, a red laser light source for 2D image recording (e.g., a HeNe laser with the wavelength of 633 nm) 100R is branched by a polarized beam splitter 102R. A green laser light source for image replication (e.g., a laser of a wavelength of 532 nm using a semiconductor-excitation secondharmonic wave) 100G is provided.

A green laser beam is incident on a polarized beam splitter 102G via the ½ wavelength plate 101. A red laser beam branched by the polarized beam splitter 102R is also incident on a polarized beam splitter 102G. The red laser beam and the green laser beam are synthesized by the polarized beam splitter 102G and are incident on the spatial filter 103. The laser beam from the spatial filter 103 is converted into parallel beams when passes through the collimation lens 104 and the hologram recording medium 105 and the hologram master 106 are irradiated with the parallel beams.

The red laser beam branched by the polarized beam splitter 102R is reflected by the mirror 107 and is incident on the spatial filter 108. The laser beam expanded by the spatial filter 108 is incident on the mirror 110 via the collimation lens 109. The laser beam reflected by the mirror 110 is incident on the liquid crystal panel 112 as a spatial light modulation element. Although not illustrated, a liquid crystal driving section, e.g., a microcomputer, is connected to the liquid crystal panel 112. An image of the additional information is displayed on the liquid crystal panel 112 by the liquid crystal driving section. The polarizing plate 113 is provided on an emission surface of the liquid crystal display panel 112. The polarizing plate 113 rotates the polarization plane to convert a P wave into an S wave.

In the configuration illustrated in FIG. 21, the diffuser plate 111 is disposed at a side at which the light from the projection lens 116 is incident. An additional information light generated by the liquid crystal display panel 112 and transmitted the polarizing plate 113 is incident on the diffuser plate 111 via an image formation optical system which includes a projection lens 114, a diaphragm 115 and a projection lens 116.

In the configuration illustrated in FIG. 21, the louver 117 is disposed between the diffuser plate 111 and the hologram master 106. The louver 117 prevents unnecessary lights, such as reflected light, from falling on the hologram master 106. The louver 117 has black-colored planar absorption layers disposed inside the transparent plate at constant intervals. The additional information light and the diffusing components thereof are allowed to transmit the absorption layer of the louver 117. The parallel beams for replication which has passed the collimation lens 104 are not allowed to transmit the absorption layer of the louver 117.

Interference fringes formed by superimposed light of the light diffracted by the hologram master 106 and the additional information light transmitted the hologram master 106 and by incidence laser beam is recorded on the hologram recording medium 105. Accordingly, a green replicated image and a red 2D image can be recorded in a hologram area of the hologram master 106. The red image and the green image may be recorded simultaneously or in time sequence. Optical configurations for the replication and the additional information may be similar to those in the foregoing embodiments.

Figure 22A:
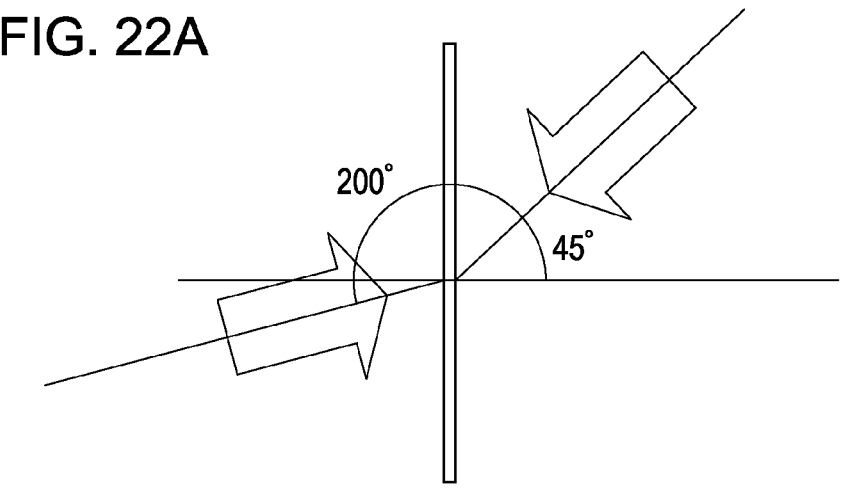
FIGS. 22A to 22C each are a schematic diagram illustrating a modified embodiment of the replicating device according to the fifth embodiment of the invention.

Another method to change the colors of the additional information and the image hologram will be described with reference to FIG. 22. In another method, no different-colored laser is used and only the laser for image replication is used to cause the image to be recognized by color development at different wavelengths from that of the laser. At the time of recording, as illustrated in FIG. 22A, a green laser with a wavelength of 532 nm is used and an incidence angle of the reference light is set to 45° and an incidence angle of the object light is set to 200°.

Figure 22B:
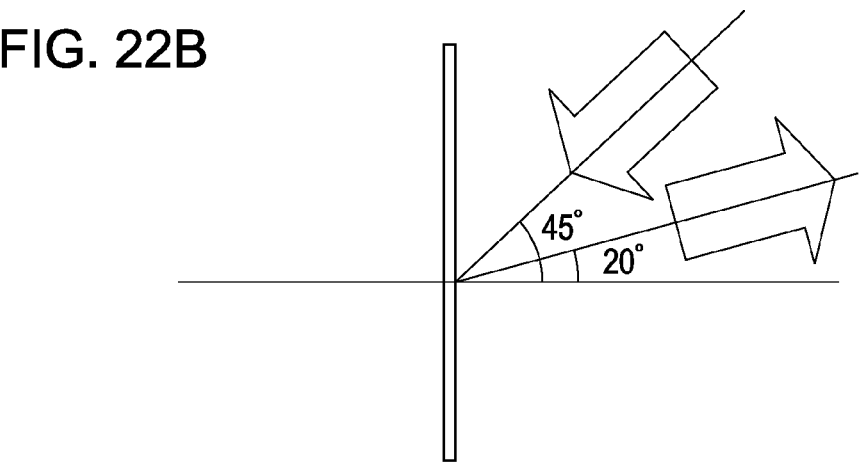
Figure 22C:
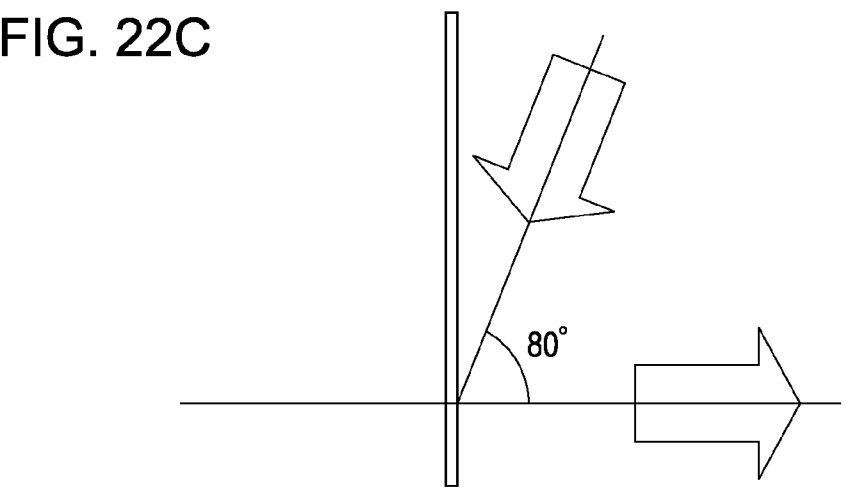
Figure 23:
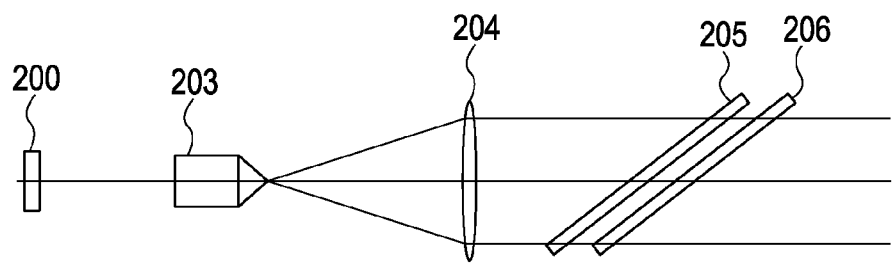
FIG. 23 is a schematic diagram illustrating a related art contact printing device.

An experiment revealed that, at the time of reproduction, as illustrated in FIG. 22B, when the illumination light is incident at an incidence angle of 45°, the reproduced light emitted at an angle of 20° becomes green. On the other hand, as illustrated in FIG. 22C, when the illumination light is incident at an incidence angle of 80°, the reproduced light emitted at 0° (front) becomes bluish having the wavelength of about 500 nm. This is because the reproduction wavelength is varied by conditions of Bragg diffraction although the reproduction wavelength is actually influenced by the thickness variation of the holographic recording material and mobility. By taking advantage of this principle, the replicated image and the additional information image may have different colors at an intended diffraction angle, which makes it easy to distinguish the two pieces of information.

7. Modified Embodiment

Although embodiments to which the invention is applied have been described in detail above, the invention is not limited to those described and various modifications can be made. For example, image information other than the identification information, such as serial numbers, manufacturer names, lot numbers, 1D barcodes and 2D barcodes, may alternatively be recorded as additional information. Regarding the additional information, the spatial light modulation element has been described to be projected at the same magnification. The spatial light modulation element, however, may alternatively be expanded or reduced in size. Two or more pieces of additional information may also be recorded. The film-shaped hologram recording medium used in the third embodiment may also be employed as a hologram recording medium in other embodiments. Although a liquid crystal panel is employed as a spatial light modulation element in the foregoing description, devices other than the liquid crystal panel may alternatively be used.

It should be understood by those skilled in the art that various modifications, combinations, sub-combinations and alterations may occur depending on design requirements and other factors insofar as they are within the scope of the appended claims or the equivalents thereof.

What is claimed is:

1. A hologram replicating device, comprising:
   a hologram recording medium that includes a photosensitive material;
   a hologram master that is brought into close contact with a surface of the hologram recording medium directly or with a refractive index adjustor therebetween, an image of the hologram master to be replicated onto the hologram recording medium;
   a spatial light modulation element that modulates a laser beam in accordance with additional information to generate a modulated light, the additional information to be recorded on the hologram recording medium with the image of the hologram master, the additional information being separate from the image of the hologram master, and the additional information being information observable by a user once recorded on the hologram recording medium; and
   an image formation optical system that irradiates the hologram recording medium, via the hologram master, with the modulated light from the spatial light modulation element,
   wherein,
      the hologram replicating device is configured such that the hologram recording medium is simultaneously irradiated with reference light for replication of the image of the hologram master and the modulated light from the spatial light modulation element such that the image of the hologram master and the additional information are recorded on the hologram recording medium, the additional information being recorded on the hologram recording medium in a hologram area in which the image of the hologram master is recorded so that the hologram area includes both a replicated image of the hologram master and the additional information, and the additional information is observable by the user independently from the replicated image of the hologram master.

2. The hologram replicating device according to claim 1, wherein the hologram master is a Lippmann hologram.

3. The hologram replicating device according to claim 1, wherein a light-polarizing element is disposed near the hologram master at a side on which the modulated light is made incident on the hologram master.

4. A hologram replicating device, comprising:
   a hologram recording medium that includes a photosensitive material;
   a hologram master that is brought into close contact with a surface of the hologram recording medium directly or with a refractive index adjustor therebetween, an image of the hologram master to be replicated onto the hologram recording medium;
   a laser beam forming section that generates reference light for replication and at least first and second laser beams through branching;
   a first spatial light modulation element and a second spatial light modulation element that respectively modulate the first and second laser beams in accordance with first and second additional information to generate first and second modulated light, respectively, the first and second additional information to be recorded on the hologram recording medium with the image of the hologram master, the first and second additional information being separate from the image of the hologram master, and the first and second additional information being information observable by a user once recorded on the hologram recording medium; and
   a first image formation optical system and a second image formation optical system that respectively irradiate the hologram recording medium, via the hologram master, with the first and second modulated light from the first and second spatial light modulation elements,
   wherein,
      the hologram replicating device is configured such that the hologram recording medium is simultaneously irradiated with reference light for replication of the image of the hologram master and the first and second modulated light from the first and second spatial light modulation elements, the first and second modulated light being irradiated at different incidence angles, such that the image of the hologram master and the first and second additional information are recorded on the hologram recording medium, the first and second additional information being recorded on the hologram recording medium in a hologram area in which the image of the hologram master is recorded so that the hologram area includes both a replicated image of the hologram master and the first and second additional information, and the first and second additional information are observable by the user independently from the replicated image of the hologram master.

5. The hologram replicating device according to claim 1, wherein the modulated light is incident on the hologram master via the image formation optical system.

6. The hologram replicating device according to claim 1, wherein the image formation optical system includes a first projection lens, a diaphragm, and a second projection lens.

7. The hologram replicating device according to claim 1, wherein the additional information includes identification information.

8. The hologram replicating device according to claim 1, wherein the additional information includes barcode information.

9. The hologram replicating device according to claim 4, wherein the hologram recording medium is irradiated with the first and second modulated light, generated from the first and second laser beams, simultaneously or in time sequence.

* * * * *